(12) United States Patent
Boone et al.

(10) Patent No.: US 8,299,189 B2
(45) Date of Patent: Oct. 30, 2012

(54) ETHYLENE/α-OLEFIN/DIENE SOLUTION POLYMERIZATION PROCESS AND POLYMER

(75) Inventors: Harold W. Boone, Sugar Land, TX (US); Carl N. Iverson, Houston, TX (US); Wayde V. Konze, Midland, MI (US); Daniel D. VanderLende, Sugar Land, TX (US)

(73) Assignee: Dow Global Technologies, LLC, Midland, MI (US)

( * ) Notice: Subject to any disclaimer, the term of this patent is extended or adjusted under 35 U.S.C. 154(b) by 910 days.

(21) Appl. No.: 12/300,863

(22) PCT Filed: Apr. 24, 2007

(86) PCT No.: PCT/US2007/009842
§ 371 (c)(1),
(2), (4) Date: Mar. 4, 2009

(87) PCT Pub. No.: WO2007/136494
PCT Pub. Date: Nov. 29, 2007

(65) Prior Publication Data
US 2012/0101241 A1    Apr. 26, 2012

Related U.S. Application Data

(60) Provisional application No. 60/801,182, filed on May 17, 2006.

(51) Int. Cl.
C08F 4/16      (2006.01)
C08F 4/64      (2006.01)
C08F 4/76      (2006.01)
C08F 210/00   (2006.01)
C08F 210/18   (2006.01)

(52) U.S. Cl. ........ 526/172; 526/161; 526/170; 526/160; 526/335; 526/336; 526/339; 526/348

(58) Field of Classification Search .................. 526/172, 526/161, 335, 336, 339, 348
See application file for complete search history.

(56) References Cited

U.S. PATENT DOCUMENTS

| | | |
|---|---|---|
| 3,485,706 A | 12/1969 | Evans |
| 3,914,342 A | 10/1975 | Mitchell |
| 3,953,413 A | 4/1976 | Hwang et al. |
| 4,173,548 A | 11/1979 | Pullukat et al. |
| 4,322,027 A | 3/1982 | Reba |
| 4,330,646 A | 5/1982 | Sakurai et al. |
| 4,413,110 A | 11/1983 | Kavesh et al. |
| 4,543,399 A | 9/1985 | Jenkins, III et al. |
| 4,564,660 A | 1/1986 | Williams et al. |
| 4,588,790 A | 5/1986 | Jenkins, III et al. |
| 4,612,300 A | 9/1986 | Coleman, III |
| 4,663,220 A | 5/1987 | Wisneski et al. |
| 4,665,208 A | 5/1987 | Welborn, Jr. et al. |
| 4,668,566 A | 5/1987 | Braun |
| 4,835,219 A | 5/1989 | Tajima et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,981,927 A | 1/1991 | Rekers et al. |
| 5,028,670 A | 7/1991 | Chinh et al. |
| 5,032,562 A | 7/1991 | Lo et al. |
| 5,064,802 A | 11/1991 | Stevens et al. |
| 5,066,741 A | 11/1991 | Campbell, Jr. |
| 5,091,352 A | 2/1992 | Kioka et al. |
| 5,103,031 A | 4/1992 | Smith, Jr. |
| 5,106,804 A | 4/1992 | Bailly et al. |
| 5,153,157 A | 10/1992 | Hlatky et al. |
| 5,157,137 A | 10/1992 | Sangokoya |
| 5,198,401 A | 3/1993 | Turner et al. |
| 5,204,419 A | 4/1993 | Tsutsui et al. |
| 5,206,197 A | 4/1993 | Campbell, Jr. |
| 5,206,199 A | 4/1993 | Kioka et al. |
| 5,235,081 A | 8/1993 | Sangokoya |
| 5,241,025 A | 8/1993 | Hlatky et al. |
| 5,248,801 A | 9/1993 | Sangokoya |
| 5,272,236 A | 12/1993 | Lai et al. |
| 5,278,272 A | 1/1994 | Lai et al. |
| 5,296,433 A | 3/1994 | Siedle et al. |
| 5,308,815 A | 5/1994 | Sangokoya |
| 5,321,106 A | 6/1994 | LaPointe |
| 5,329,032 A | 7/1994 | Tran et al. |
| 5,350,723 A | 9/1994 | Neithamer et al. |
| 5,352,749 A | 10/1994 | DeChellis et al. |
| 5,380,810 A | 1/1995 | Lai et al. |
| 5,384,299 A | 1/1995 | Turner et al. |
| 5,387,568 A | 2/1995 | Ewen et al. |
| 5,391,529 A | 2/1995 | Sangokoya |
| 5,391,793 A | 2/1995 | Marks et al. |

(Continued)

FOREIGN PATENT DOCUMENTS

EP         89691         9/1983

(Continued)

OTHER PUBLICATIONS

U.S. Appl. No. 60/801,182, filed May 17, 2006.
EP89691, Sep. 28, 1983, Beret et al.
Yano, Akihiro, Sone, Makoto, Yamada, Satoru, Hasegawa, Saiki, Sato, Morihiko, & Akimoto, Akira (2000). Effect of ligand structures on high temperature homo- and copolymerization of ethylene by cationic hafnocene catalysts based on tetrakis(pentsfluorophenyl)borate. Journal of Molecular Catalysis A: Chemical 156, 133-141.
Fineman, Morton, & Ross, Sidney D. (1950). Linear Method for Determining Monomer Reactivity Ratios in Copolymerization. Journal of Polymer Science. 5(2), 259-265.
Lambert, Joseph B., Zhang, Shizhong, & Ciro, Sol M. (1994). Silyl Cations in the Solid and in Solution. Organometallics. 13(6), 2430-2443.

(Continued)

Primary Examiner — Rip A. Lee

(57) ABSTRACT

A catalyst composition comprising a zirconium complex of a polyvalent aryloxyether and the use thereof in a continuous solution polymerization of ethylene, one or more $C_{3-30}$ olefins, and a conjugated or nonconjugated diene to prepare interpolymers having improved processing properties are disclosed.

17 Claims, No Drawings

U.S. PATENT DOCUMENTS

| | | | |
|---|---|---|---|
| 5,405,922 A | 4/1995 | DeChellis et al. | |
| 5,425,872 A | 6/1995 | Devore et al. | |
| 5,436,304 A | 7/1995 | Griffin et al. | |
| 5,453,410 A | 9/1995 | Kolthammer et al. | |
| 5,453,471 A | 9/1995 | Bernier et al. | |
| 5,461,123 A | 10/1995 | Song et al. | |
| 5,462,999 A | 10/1995 | Griffin et al. | |
| 5,473,028 A | 12/1995 | Nowlin et al. | |
| 5,502,124 A | 3/1996 | Crowther et al. | |
| 5,541,270 A | 7/1996 | Chinh et al. | |
| 5,556,238 A | 9/1996 | Chinh et al. | |
| 5,608,019 A | 3/1997 | Cheruvu et al. | |
| 5,612,271 A | 3/1997 | Zandona et al. | |
| 5,616,661 A | 4/1997 | Eisinger et al. | |
| 5,625,087 A | 4/1997 | Devore et al. | |
| 5,648,310 A | 7/1997 | Wasserman et al. | |
| 5,672,669 A | 9/1997 | Wasserman et al. | |
| 5,685,128 A | 11/1997 | Chum et al. | |
| 5,693,838 A | 12/1997 | Sangokoya et al. | |
| 5,719,095 A | 2/1998 | Brekner et al. | |
| 5,721,182 A | 2/1998 | Reichert et al. | |
| 5,721,185 A | 2/1998 | LaPointe et al. | |
| 5,731,253 A | 3/1998 | Sangokoya | |
| 5,731,451 A | 3/1998 | Smith et al. | |
| 5,744,656 A | 4/1998 | Askham | |
| 5,767,208 A | 6/1998 | Turner et al. | |
| 5,783,512 A | 7/1998 | Jacobsen et al. | |
| 5,798,427 A | 8/1998 | Foster et al. | |
| 5,849,852 A | 12/1998 | Koch et al. | |
| 5,869,575 A | 2/1999 | Kolthammer et al. | |
| 5,869,723 A | 2/1999 | Hinokuma et al. | |
| 5,883,204 A | 3/1999 | Spencer et al. | |
| 5,919,983 A | 7/1999 | Rosen et al. | |
| 5,977,251 A | 11/1999 | Kao et al. | |
| 6,103,657 A | 8/2000 | Murray | |
| 6,140,521 A | 10/2000 | Chen et al. | |
| 6,160,146 A | 12/2000 | Chen et al. | |
| 6,207,774 B1 | 3/2001 | Hasegawa et al. | |
| 6,214,760 B1 | 4/2001 | Chen et al. | |
| 6,291,609 B1 | 9/2001 | Crowther et al. | |
| 6,313,240 B1 | 11/2001 | Hasegawa et al. | |
| 6,319,989 B1 | 11/2001 | Anderson et al. | |
| 6,320,005 B1 | 11/2001 | Murray | |
| 6,395,671 B2 | 5/2002 | LaPointe | |
| 6,420,507 B1 | 7/2002 | Kale et al. | |
| 6,448,355 B1 | 9/2002 | Knight et al. | |
| 6,683,149 B2 | 1/2004 | Jain et al. | |
| 6,686,490 B1 | 2/2004 | Kol et al. | |
| 6,696,379 B1 | 2/2004 | Carnahan et al. | |
| 6,841,502 B2 * | 1/2005 | Boussie et al. | 502/125 |
| 6,869,904 B2 * | 3/2005 | Boussie et al. | 502/171 |
| 6,897,276 B2 * | 5/2005 | Boussie et al. | 526/172 |
| 6,924,342 B2 | 8/2005 | Stevens et al. | |
| 8,058,373 B2 * | 11/2011 | Stevens et al. | 526/172 |
| 8,101,696 B2 * | 1/2012 | Konze et al. | 526/172 |
| 2003/0229188 A1 | 12/2003 | Nagy et al. | |
| 2004/0010103 A1 | 1/2004 | Boussie et al. | |
| 2005/0164872 A1 | 7/2005 | Boussie et al. | |
| 2005/0215737 A1 | 9/2005 | Dharmarajan et al. | |
| 2008/0051537 A1 * | 2/2008 | Carnahan et al. | 526/170 |

FOREIGN PATENT DOCUMENTS

| | | |
|---|---|---|
| EP | 277003 | 8/1988 |
| EP | 277004 | 8/1988 |
| EP | 279586 | 8/1988 |
| EP | 426637 | 5/1991 |
| EP | 495375 | 7/1992 |
| EP | 500944 | 9/1992 |
| EP | 520732 | 12/1992 |
| EP | 561476 | 9/1993 |
| EP | 573120 | 12/1993 |
| EP | 573403 | 12/1993 |
| EP | 594218 | 4/1994 |
| EP | 608369 | 8/1994 |
| EP | 615981 | 9/1994 |
| EP | 781299 | 7/1997 |
| WO | WO-9407928 | 4/1994 |
| WO | WO-9410180 | 5/1994 |
| WO | WO-9425495 | 11/1994 |
| WO | WO-9428032 | 12/1994 |
| WO | WO-9514044 | 5/1995 |
| WO | WO-9516716 | 6/1995 |
| WO | WO-9722639 | 6/1997 |
| WO | WO-9807515 | 2/1998 |
| WO | WO-9809996 | 3/1998 |
| WO | WO-9832775 | 7/1998 |
| WO | WO-9843983 | 10/1998 |
| WO | WO-9915534 | 4/1999 |
| WO | WO-9918135 | 4/1999 |
| WO | WO-9942467 | 8/1999 |
| WO | WO-9945041 | 9/1999 |
| WO | WO-0206362 | 1/2002 |
| WO | WO-03010171 | 2/2003 |
| WO | WO-03040195 | 5/2003 |
| WO | WO-03102042 | 12/2003 |
| WO | WO-2006020624 | 2/2006 |
| WO | WO 2007/136493 A2 * | 11/2007 |
| WO | WO 2007/136506 A2 * | 11/2007 |

OTHER PUBLICATIONS

Lambert, Joseph B., & Zhang, Shizhong (1993). Tetrakis(pentafluorophenyl)borate: a New Anion for Silylium Cations in the Condensed Phase. J. Chem. Soc., Chem. Commun.. 383-384.

Mayo, Frank R., & Walling, Cheves (1950). Copolymerization. Chemical Reviews. 46(2), 191-287.

* cited by examiner

ETHYLENE/α-OLEFIN/DIENE SOLUTION POLYMERIZATION PROCESS AND POLYMER

CROSS REFERENCE STATEMENT

This application claims the benefit of U.S. Provisional Application 60/801,182, filed May 17, 2006. This application is a National Stage entry under 35 USC §371 of PCT/US2007/009842, filed Apr. 24, 2007.

BACKGROUND OF THE INVENTION

Catalyst compositions based on well defined donor ligand containing metal complexes, referred to as post-metallocene complexes have been shown to give products having better comonomer incorporation and narrow molecular weight distribution. However, these catalysts often have poor high temperature stability and suffer from poor catalytic efficiencies, especially at elevated polymerization temperatures. When employed to prepare ethylene, α-olefin and diene containing polymers, especially ethylene, propylene, and ethyl idenenorbornene (ENB) containing polymers, the resulting polymer molecular weight and comonomer incorporation ratio is often deficient.

Examples of one type of the foregoing post metallocene catalysts are disclosed in U.S. Pat. No. 6,897,276, where Group 3-6 or Lanthanide metal complexes, preferably Group 4 metal complexes, of bridged divalent aromatic ligands containing a divalent Lewis base chelating group are disclosed.

Higher solution reaction temperatures are particularly desired for ethylene/α-olefin/diene polymerizations in order to improve operating efficiency. However, the use of higher reaction temperatures often results in poor α-olefin and diene conversions. Accordingly, selection of catalyst compositions capable of incorporating increased amounts of α-olefin and diene comonomers at elevated reaction temperatures is highly desired.

We have now discovered that certain metal complexes may be employed in a solution polymerization process to prepare high molecular weight ethylene containing interpolymers containing relatively large α-olefin and diene contents. The resulting polymer products possess desirable properties such as increased tensile properties, reduced density (greater comonomer incorporation) and improved high temperature performance. In addition, we have discovered that these catalyst compositions retain their high catalyst activity using relatively low molar ratios of conventional alumoxane cocatalysts. The use of reduced quantities of alumoxane cocatalysts (reduced by up to 90 percent or more, compared to the quantities employed in conventional processes) allows for the preparation of polymer products having reduced metal content and consequently increased clarity, improved dielectric properties and other enhanced physical properties. In addition, the use of reduced quantities of alumoxane cocatalysts results in reduction in polymer production costs.

SUMMARY OF THE INVENTION

According to the present invention there is now provided a process for polymerization of ethylene, one or more $C_{3-20}$ α-olefins and a conjugated or non-conjugated diene under solution polymerization conditions with a catalyst composition comprising a zirconium complex of a polyvalent aryloxyether which affords interpolymers having high α-olefin and diene contents compared to the use of conventional catalysts.

Additionally, according to the invention it is possible to produce interpolymers possessing relatively high molecular weights (with correspondingly low melt indices) and high levels of comonomer incorporation (low densities), having relatively good high temperature resistance. This unique combination of polymer properties is also attainable by use of low molar ratios (200 or less, preferably 100 or less, more preferably 80 or less, based on zirconium) of an alkylalumoxane cocatalyst or a trialkylaluminum-modified alumoxane cocatalyst. The polymers are capable of preparation under high temperature, high conversion conditions at high catalyst efficiencies.

The present invention is particularly advantageous for use under continuous solution polymerization conditions wherein a reaction mixture comprising a metal complex, an activating cocatalyst or cocatalyst mixture, optionally a chain transfer agent, ethylene, a $C_{3-30}$ α-olefin, especially propylene, and at least one $C_{4-20}$ conjugated or nonconjugated diene are continuously added to a reactor operating under solution polymerization conditions, and polymer product is continuously or semi-continuously removed therefrom. In one embodiment, the invention is used to prepare copolymers of ethylene, propylene and 5-ethylidene-2-norbornene having increased polymerized propylene and diene monomer contents.

The invention is particularly suitable for production of resins that are used in the preparation of adhesives, films (including membranes for roofing and architectural applications), and molded or extruded articles having improved high temperature use properties, with or without subsequent curing or cross-linking.

DETAILED DESCRIPTION OF THE INVENTION

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date hereof. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms, but no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylselenogroup is within the scope of the term heteroalkyl. Examples of specific heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing $(4\delta+2)$ $\pi$-electrons, wherein $\delta$ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted, aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone, or oxygen as in diphenylether, or nitrogen as in diphenylamine.

Embodiments of the invention provide a new solution process for making ethylene/$\alpha$-olefin/diene interpolymers using a catalyst composition comprising a transition metal complex at high temperature, high catalyst efficiency and high monomer conversion. Highly desirably, the produced polymers are of high molecular weight ($I_2<5.0$). Such polymers are suitably employed where improved high temperature performance is desired, such as in molding and extrusion grades of polymer especially for extruded films and profiles or molded parts applications.

The term "polymer" as used herein refers to a macromolecular compound prepared by polymerizing one or more monomers. A polymer refers to homopolymers, copolymers, terpolymers, interpolymers, and so on. The term "interpolymer" is used herein interchangeably with the term copolymer to refer to polymers incorporating in polymerized form at least two copolymerizable monomers, or incorporating long chain branching as a result of chain termination/olefin formation reactions in situ, and reincorporation of the in situ formed olefin. Accordingly, copolymers may result from the polymerization of a single monomer, under the correct operating conditions. The least prevalent monomer or monomers in the resulting interpolymer are generally referred to by the term "comonomer". The chain length of the resulting long chain branches referred to above, is consequently longer than the carbon length resulting from polymerization of any deliberately added comonomer, and in particular, is longer than 6 carbons for ethylene/1-octene copolymers. The presence of long chain branching may also be detected by the increased shear sensitivity of the polymer, as disclosed in EP-A-608,369, and elsewhere, or determined by Melt Index Ratio (MIR), a ratio of polymer melt viscosities measured under differing loads, especially $I_{21}/I_2$.

The process described herein may be employed to prepare any olefin interpolymer, especially copolymers of ethylene, one or more $C_{3-20}$ olefins, and one or more $C_{4-20}$ diolefins, and especially, ethylene/propylene/5-ethylidene-2-norbornene (EPDM) interpolymers.

Polymerization conditions generally refer to temperature, pressure, monomer content (including comonomer concentration), catalyst concentration, cocatalyst concentration, monomer conversion, or other conditions that influence the properties of the resulting polymer. By operation according to the prescribed polymerization conditions of the invention, high molecular weight polymers may be prepared having relatively high comonomer incorporation with high catalyst activities, low cocatalyst usage and high molecular weights. In particular, activities (based on weight of polymer to weight of transition metal) greater than 0.5 g/µg, preferably greater than 0.55 g/µg, and even greater than 0.6 g/µg are possible.

Polymer weight-average molecular weight ($M_w$) is measured by gel permeation chromatography, one technique of which as described in U.S. Pat. No. 5,272,236. Alternatively, melt index, $I_2$, $I_{10}$ or $I_{21}$, measured, for example, according to ASTM D-1238 may be employed as an indication of molecular weight. Generally, melt index is inversely related to the molecular weight of the polymer. The higher the molecular weight, the lower the melt index, although the relationship is not necessarily linear. Alternatively, Mooney viscosity (ML 1+4 @ 100° C.) may be used as a measure of molecular weight. Suitable polymers are those having a Mooney viscosity in the range from 10 to 135, more preferably from 25 to 100, and most preferably from 30 to 80.

One embodiment of this invention entails a process which comprises contacting ethylene, one or more $C_{3-30}$ $\alpha$-olefins, especially propylene, and a conjugated or non-conjugated diene, especially 5-ethylidene-2-norbornene in a solution polymerization process. The present invented process is particularly advantageous for use under polymerization conditions wherein a reaction mixture comprising metal complex, activating cocatalyst, ethylene, and at least one $C_{3-30}$ $\alpha$-olefin comonomer (or the individual components thereof) is continuously or intermittently added to a reactor operating under solution polymerization conditions, optionally in the additional presence of a chain transfer agent, and polymerized product is continuously or semi-continuously removed therefrom.

In a general sense, the present process comprises polymerizing ethylene, one or more $C_{3-30}$ α-olefins, and a diolefin using a zirconium complex and from 10 to 200 moles per mole zirconium of an alumoxane, under continuous, solution polymerization conditions at a temperature from 120 to 250° C., preferably from 130 to 250° C., under high ethylene conversion conditions (>85 percent, preferably >90 percent) to prepare a polymer comprising from 0 to 99, preferably 50 to 90 percent ethylene, 9.5 to 99.5, preferably 10 to 50 percent α-olefin, and 0.1 to 50, preferably 0.1 to 20, more preferably 0.1 to 15 percent diene.

Surprisingly, the present metal complexes are capable of producing polymers from diene monomers having extremely high molecular weight under a variety of polymerization conditions, and catalyst efficiencies of greater than 0.5 $g_{polymer}/\mu g_{metal}$, thereby allowing the use of a chain transfer agent to control molecular weight without sacrificing molecular weight distribution, α-olefin content or diene content. A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.01 mol percent (based on ethylene) is used, and a maximum of about 2 mol percent is used. Especially surprising is the fact that high comonomer content polymers can be prepared with high levels of chain transfer agents, while still affording narrow molecular weight distribution polymers using low levels of alumoxane activators. Generally, use of high levels of chain transfer agent and high levels of comonomer with conventional catalysts results in production of polymers having broadened molecular weight distributions.

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" is defined to be any compound or component or method which can activate the metal complex in the foregoing manner. Non-limiting examples of suitable activators include Lewis acids, non-coordinating ionic activators, ionizing activators, organometal compounds, and combinations of the foregoing substances capable of converting the neutral metal complex to a catalytically active species.

It is believed, without desiring to be bound by such belief, that in one embodiment of the invention, catalyst activation may involve formation of a cationic, partially cationic, or zwitterionic species, by means of proton transfer, oxidation, or other suitable activation process. It is to be understood that the present invention is operable and fully enabled regardless of whether or not such an identifiable cationic, partially cationic, or zwitterionic species actually results during the activation process, also interchangeably referred to herein as an "ionization" process or "ionic activation process".

Ionizing cocatalysts may contain an active proton, or some other cation associated with, but not coordinated to or only loosely coordinated to, an anion of the ionizing compound. Such compounds are described in European publications EP-A-570982, EP-A-520732, EP-A-495375, EPA-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)ammonium- and methylbis(tetradecyl)-ammonium-cations and a non-coordinating anion, especially a tetrakis(perfluoro)arylborate anion, especially tetrakis(pentafluorophenyl)borate. It is further understood that the cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyldi($C_{14-20}$alkyl)ammonium tetrakis(pentafluorophenyl)borate.

Activation methods using ionizing ionic compounds not containing an active proton but capable of forming active catalyst compositions, such as ferrocenium salts of the foregoing non-coordinating anions are also contemplated for use herein, and are described in EP-A-426637, EP-A-573403 and U.S. Pat. No. 5,387,568. Also included is the use of strong Lewis acids, especially tris(perfluoro)aryl borane compounds, such as tris(pentafluorophenyl)borane, which are capable of abstraction of a ligand groups, especially a hydrocarbyl ligand, thereby forming a non-coordinating counter anion for the cationic derivative of the metal complex.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

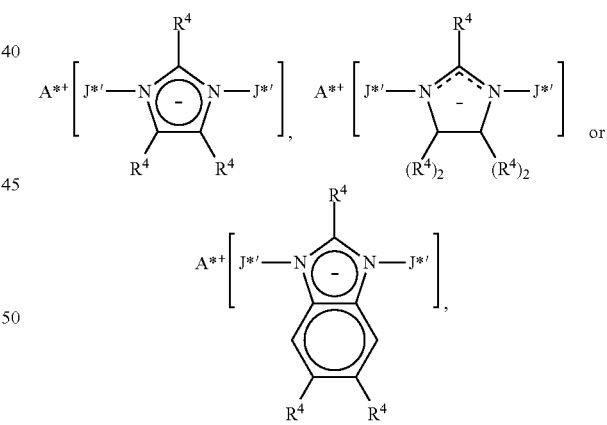

wherein:

$A^{*+}$ is a cation, especially a proton containing cation, and preferably is a trihydrocarbyl ammonium cation containing one or two $C_{10-40}$ alkyl groups, especially a methyldi($C_{14-20}$alkyl)ammonium-cation, $R^4$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $J^{*'}$ is tris(pentafluorophenyl)borane or tris(pentafluorophenyl)alumane).

Examples of these catalyst activators include trihydrocarbylammonium-salts, especially, methyldi($C_{14-20}$alkyl)ammonium-salts of: bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane)-4,5-bis(heptadecyl)imidazolinide, bis(tris(pentafluorophenyl)borane)-5,6-dimethylbenzimidazolide, bis(tris(pentafluorophenyl)borane)-5,6-bis(undecyl)benzimidazolide, bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenyl)alumane)-4,5-bis(undecyl)imidazolide, bis(tris(pentafluorophenyl)alumane)-4,5-bis(heptadecyl)imidazolide, bis(tris(pentafluorophenyl)alumane)imidazolinide, bis(tris(pentafluorophenyl)alumane)-2-undecylimidazolinide, bis(tris(pentafluorophenyl)alumane)-2-heptadecylimidazolinide, bis(tris(pentafluorophenyl)alumane)-4,5-bis(undecyl)imidazolinide, bis(tris(pentafluorophenyl)alumane)-4,5-bis(heptadecyl)imidazolinide, bis(tris(pentafluorophenyl)alumane)-5,6-dimethylbenzimidazolide, and bis(tris(pentafluorophenyl)alumane)-5,6-bis(undecyl)benzimidazolide.

Other activators include those described in PCT publication WO 98/07515 such as tris(2,2', 2"-nonafluorobiphenyl)fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. EP-A-781299 describes using a silylium salt in combination with a non-coordinating compatible anion. Other activators or methods for activating a catalyst compound are described in for example, U.S. Pat. Nos. 5,849,852, 5,869,723, EP-A-615981, and PCT publication WO 98/32775.

Another suitable class of organometal activators or cocatalysts are alumoxanes, also referred to as alkylaluminoxanes. Alumoxanes are well known activators for use with metallocene type catalyst compounds to prepare addition polymerization catalysts. There are a variety of methods for preparing alumoxanes and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180. Preferred alumoxanes are Lewis acid modified alumoxanes, especially tri($C_{3-6}$)alkylaluminum modified methylalumoxane, including tri(isobutyl)aluminum modified methalumoxane, available commercially as MMAO-3A or tri(n-octyl)aluminum modified methalumoxane, available commercially as MMAO-12, from Akzo Nobel, Inc.

It is within the scope of this invention to use alumoxane(s) or modified alumoxane(s) as an activator or as a tertiary component in the invented process. That is, the compound may be used alone or in combination with other activators, either neutral or ionic, such as tri(alkyl)ammonium tetrakis(pentafluorophenyl)borate compounds, trisperfluoroaryl compounds, polyhalogenated heteroborane anions as disclosed in WO 98/43983, and combinations thereof. When used as a tertiary component, the amount of alumoxane employed is generally less than that necessary to effectively activate the metal complex when employed alone. In this embodiment, it is believed, without wishing to be bound by such belief, that the alumoxane does not contribute significantly to actual catalyst activation. Not withstanding the foregoing, it is to be understood that some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum- or halogenated tri(hydrocarbyl)boron-modified alumoxanes, having from 1 to 10 carbons in each hydrocarbyl or halogenated hydrocarbyl group. Such activating cocatalysts are previously disclosed in U.S. Pat. Nos. 6,214,760, 6,160,146, 6,140,521, and 6,696,379, and elsewhere. Preferred Lewis acid-modified alumoxane compounds are tri(i-butyl)aluminum-modified methalumoxane and tri(n-octyl)aluminum-modified methalumoxane containing from 10 to 30, preferably 15 to 25 mole percent i-butyl content and 10 to 20, preferably 12 to 18 mole percent n-octyl contents, respectively, said molar percents based on total alkyl ligand content. The alumoxane or Lewis acid-modified alumoxane activator is preferably utilized in molar ratios cocatalyst:catalyst from 20-200, more preferably from 20-150, and most preferably from 20-80.

Because of the ability to be activated at relatively low levels of alumoxane or Lewis acid modified alumoxane cocatalysts while maintaining high catalyst efficiency, the present zirconium complexes can achieve reduced levels of cocatalyst byproducts in the resulting polymer along with long chain branch formation in the resulting polymer. This in turn allows the polymers to be employed in demanding applications that have been previously unsuited for ethylene/α-olefin interpolymers, such as wire and cable electrical insulation and extrusion forming process for profiles, pipes, and other applications, while retaining good flexibility and processing properties.

Multiple reactor polymerization processes may be suitably employed in the present invention. Examples include such systems as are disclosed in U.S. Pat. No. 3,914,342, among others. The multiple reactors can be operated in series or in parallel, with at least one catalyst composition according to the present invention employed in at least one of the reactors. One or both reactors may also contain at least two catalysts which have different comonomer incorporation capability and/or different molecular weight capability. In one embodiment, a relatively high molecular weight product ($M_w$ from 100,000 to over 1,000,000, more preferably 200,000 to 500,000) is formed while in the second reactor a product of a relatively low molecular weight ($M_w$ 2,000 to 300,000) is formed. Both of these reactor products can have similar or different densities and/or elastomer content. The final product is a mixture of the two reactor effluents which are combined prior to devolatilization to result in a uniform mixing of the two or more polymer products. In another embodiment, one reactor may be used to prepare a high ethylene content copolymer optionally containing diene while the second reactor is employed to prepare a homopolymer of either ethylene or the α-olefin or a copolymer of ethylene and one or more α-olefins. Such a dual reactor process allows for the preparation of products with tailored properties. In one embodiment, the reactors are connected in series, that is, the effluent from the first reactor is charged to the second reactor and fresh monomer, solvent and hydrogen is optionally added to the second reactor. Reactor conditions are adjusted such that the weight ratio of polymer produced in the first reactor to that produced in the second reactor is ideally in the range from 5:95 to 95:5. It will be appreciated by the skilled artisan that the foregoing dual reactor process is capable of producing polymers having broadened molecular weight distribution or polydispersity index (PDI). Preferred polymers made in the foregoing manner have PDI from 2.8 to 10.0, more preferably from 3.0 to 7.0. In addition, in a desirable embodiment, the high molecular weight component contains higher quantities of α-olefin comonomer (lower density) than the low molecular weight component.

In one embodiment, one of the reactors in the polymerization process, including the first of two reactors operating in series, contains a heterogeneous Ziegler-Natta catalyst or a chromium containing catalyst, such as one of the numerous such catalysts known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646, and 5,869,575. Suitable chromium based catalysts are those disclosed in U.S. Pat. Nos. 4,981,927, 4,835,219, 4,564,660, 4,173,548, 3,953,413, and elsewhere.

Single reactor, multiple catalyst processes are also useful in the present invention. In one embodiment, two or more catalysts are introduced into a single reactor at the high monomer conversion conditions that are herein disclosed, wherein each catalyst inherently produces different interpolymer products. In one embodiment, a relatively high molecular weight product ($M_w$ from 100,000 to over 1,000,000, more preferably 200,000 to 500,000) is formed from one catalyst while a product of a relatively low molecular weight ($M_w$ 2,000 to 300,000) is formed from the other catalyst. Both of these catalyst compositions can have similar or different comonomer incorporation ability, at least one of which comprises a metal complex as set forth herein. The resulting polymer will have properties dependant on the ratio of the two catalysts that are employed in the single reactor. Suitable combinations of polymer molecular weight, comonomer incorporation ability, processes, and ratios of catalysts for such products are disclosed in U.S. Pat. No. 6,924,342. Due to the unique compatibility of the present catalyst compositions with other olefin polymerization catalysts, including Ziegler/Natta catalysts, the second catalyst composition may comprise a metal complex as herein disclosed, a metallocene or other π-bonded ligand group containing metal complex (including constrained geometry metal complexes), or a polyvalent heteroatom ligand group containing metal complex, especially polyvalent pyridylamine or imidizolylamine based complexes and tetradendate oxygen-ligated biphenylphenol based Group 4 metal complexes.

Metal Complexes

Suitable metal complexes for use according to the present invention include compounds corresponding to the formula:

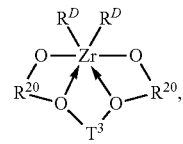

where:
$R^{20}$ independently each occurrence is a divalent aromatic or inertly substituted aromatic group containing from 5 to 20 atoms not counting hydrogen;
$T^3$ is a divalent hydrocarbon or silane group having from 1 to 20 atoms not counting hydrogen, or an inertly substituted derivative thereof; and
$R^D$ independently each occurrence is a monovalent ligand group of from 1 to 20 atoms, not counting hydrogen, or two $R^D$ groups together are a divalent ligand group of from 1 to 20 atoms, not counting hydrogen.

Preferably, such complexes correspond to the formula:

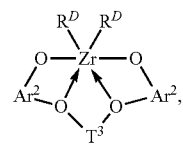

wherein:
$Ar^2$ independently each occurrence is an arylene or an alkyl-, aryl-, alkoxy- or amino-substituted arylene group of from 6 to 20 atoms not counting hydrogen or any atoms of any substituent;
$T^3$ is a divalent hydrocarbon bridging group of from 2 to 20 atoms not counting hydrogen, preferably a divalent substituted or unsubstituted $C_{3-6}$ aliphatic, cycloaliphatic, or bis(alkylene)-substituted cycloaliphatic group; and
$R^D$ independently each occurrence is a monovalent ligand group of from 1 to 20 atoms, not counting hydrogen, or two $R^D$ groups together are a divalent ligand group of from 1 to 40 atoms, not counting hydrogen.

More preferred examples of metal complexes suitable for use herein include compounds of the formula:

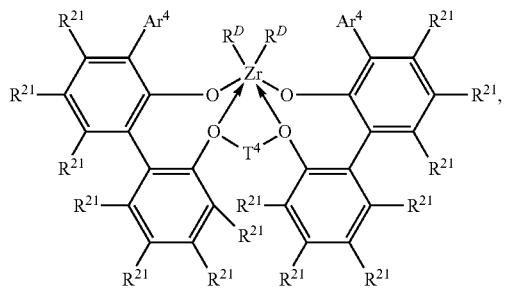

where
$Ar^4$ independently each occurrence is $C_{6-20}$ aryl or inertly substituted derivatives thereof, especially 3,5-di(isopropyl)phenyl, 3,5-di(isobutyl)phenyl, 3,5-di(tertbutyl)phenyl, dibenzo-1H-pyrrole-1-yl, naphthyl, anthracen-5-yl, 1,2,3,4,6,7,8,9-octahydroanthracen-5-yl;

T⁴ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

Especially preferred metal complexes are compounds of the formula:

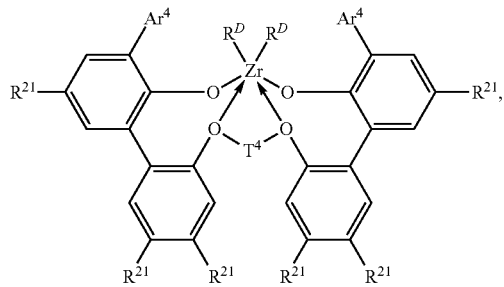

where, $Ar^4$, independently each occurrence, is 3,5-di(isopropyl)phenyl, 3,5-di(isobutyl)phenyl, 3,5-di(tertbutyl)phenyl, dibenzo-1H-pyrrole-1-yl, or anthracen-5-yl, $R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen;

T⁴ is propan-1,3-diyl, cyclohexanediyl, cyclohexen-4,5-diyl, or bis(methylene)cyclohexan-1,2-diyl; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

Compared to metal complexes comprising a 1,4-butandiyl T⁴ group, the foregoing complexes demonstrate improved catalyst efficiencies, especially at elevated polymerization temperatures. Most highly preferred metal complexes according to the invention correspond to the formulas:

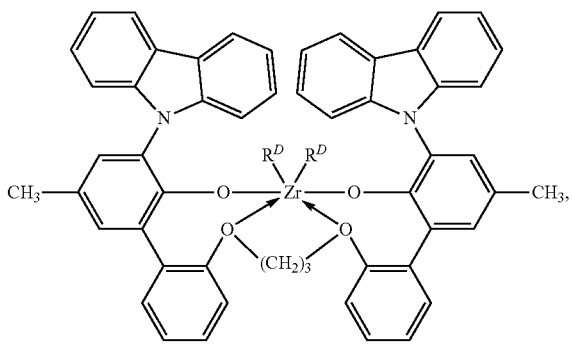

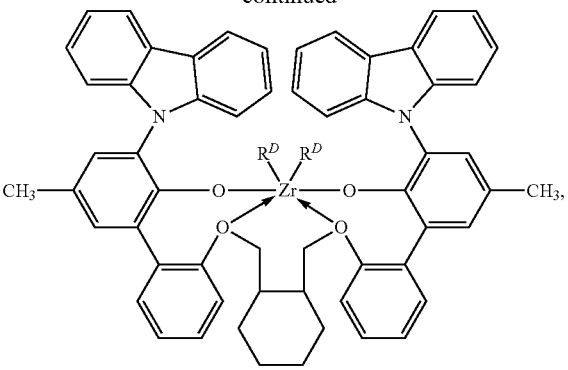

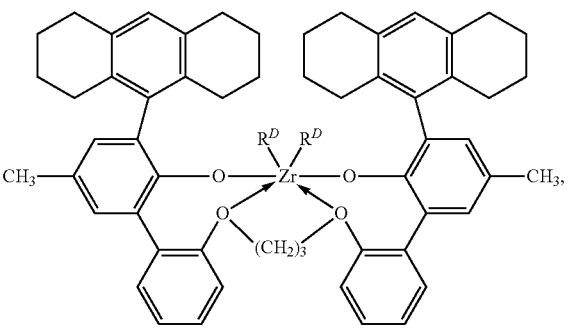

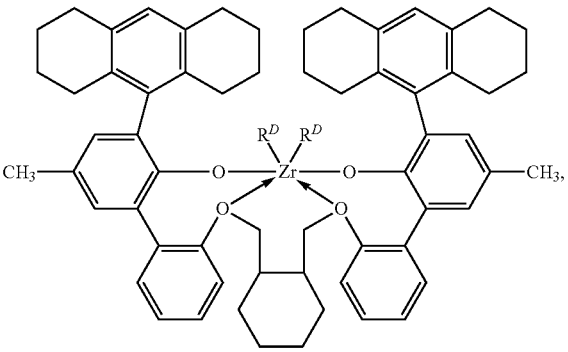

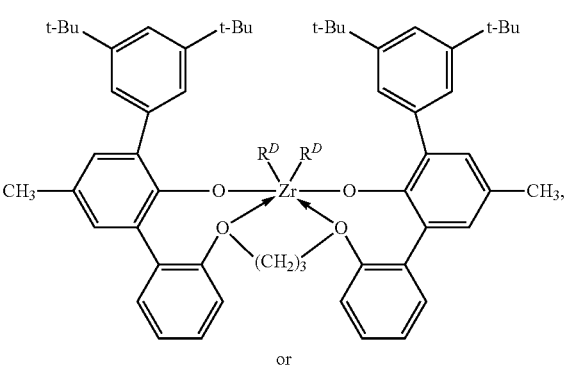

or

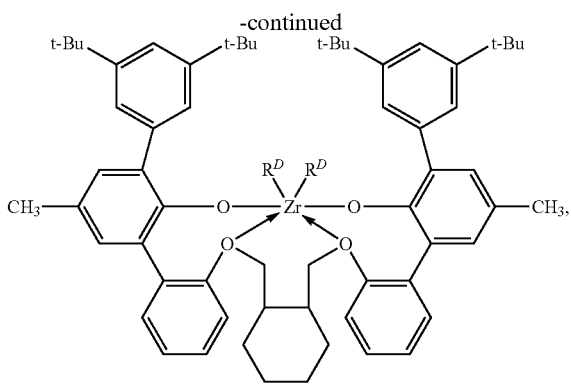

wherein, $R^D$ independently each occurrence is chloro, methyl or benzyl.

Specific examples of suitable metal complexes are the following compounds:

A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-2-phenoxy)-1,3-propanediylzirconium (IV) dibenzyl,
bis((2-oxoyl-3-(dibenzo-1H-pyrrole-1-yl)-5-(methyl)phenyl)-2-phenoxy)-1,3-propanediylzirconium (IV) dimethyl,
bis((2-oxoyl-3-(dibenzo-1H-pyrrole-1-yl)-5-(methyl)phenyl)-2-phenoxy)-1,3-propanediylzirconium (IV) dichloride,
bis((2-oxoyl-3-(dibenzo-1H-pyrrole-1-yl)-5-(methyl)phenyl)-2-phen oxy)-1,3-propanediylzirconium (IV) dibenzyl,
bis((2-oxoyl-3-(3,5-di-(1,1-dimethylethyl)phenyl)-5-(methyl)phenyl)-2-phen oxy)-1,3-propanediylzirconium (IV) dimethyl,
bis((2-oxoyl-3-(3,5-di-(1,1-dimethylethyl)phenyl)-5-(methyl)phenyl)-2-phenoxy)-1,3-propanediylzirconium (IV) dichloride,
bis((2-oxoyl-3-(3,5-di-(1,1-dimethylethyl)phenyl)-5-(methyl)phenyl)-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-2-phenoxymethyl)-trans-1,2-cyclohexanediyl zirconium (IV) dichloride,
bis((2-oxoyl-3-(dibenzo-1H-pyrrole-1-yl)-5-(methyl)phenyl)-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl,
bis((2-oxoyl-3-(dibenzo-1H-pyrrole-1-yl)-5-(methyl)phenyl)-2-phenoxy)-cis-1,3-cyclohexanediylzirconium (IV) dimethyl,
bis((2-oxoyl-3-(dibenzo-1H-pyrrole-1-yl)-5-(methyl)phenyl)-2-phenoxy)-cis-1,3-cyclohexanediylzirconium (IV) dichloride,
bis((2-oxoyl-3-(dibenzo-1H-pyrrole-1-yl)-5-(methyl)phenyl)-2-phenoxy)-cis-1,3-cyclohexanediylzirconium (IV) dibenzyl
bis((2-oxoyl-3-(3,5-di-(1,1-dimethylethyl)phenyl)-5-(methyl)phenyl)-2-phenoxy)-cis-1,3-cyclohexanediylzirconium (IV) dimethyl,
bis((2-oxoyl-3-(3,5-di-(1,1-dimethylethyl)phenyl)-5-(methyl)phenyl)-2-phenoxy)-cis-1,3-cyclohexanediylzirconium (IV) dichloride,
bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dimethyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dibenzyl,
bis((2-oxoyl-3-(dibenzo-1H-pyrrole-1-yl)-5-(methyl)phenyl)-2-phenoxy)-cis-4,5-cyclohexenediylzirconium (IV) dimethyl,
bis((2-oxoyl-3-(dibenzo-1H-pyrrole-1-yl)-5-(methyl)phenyl)-2-phenoxy)-cis-4,5-cyclohexenediylzirconium (IV) dichloride,
bis((2-oxoyl-3-(dibenzo-1H-pyrrole-1-yl)-5-(methyl)phenyl)-2-phenoxy)-cis-4,5-cyclohexenediylzirconium (IV) dibenzyl
bis((2-oxoyl-3-(3,5-di-(1,1-dimethylethyl)phenyl)-5-(methyl)phenyl)-2-phenoxy)-cis-4,5-cyclohexenediylzirconium (IV) dimethyl,
bis((2-oxoyl-3-(3,5-di-(1,1-dimethylethyl)phenyl)-5-(methyl)phenyl)-2-phenoxy)-cis-4,5-cyclohexenediylzirconium (IV) dichloride,
bis((2-oxoyl-3-(3,5-di-(1,1-dimethylethyl)phenyl)-5-(methyl)phenyl)-2-phenoxy)-cis-4,5-cyclohexenediylzirconium (IV) dibenzyl, B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dibenzyl,
bis((2-oxoyl-3-(dibenzo-1,1-pyrrole-1-yl)-5-(methyl)phenyl)-(4-methyl-2-phenoxy)-1,3-propanediylzirconium (IV) dimethyl,
bis((2-oxoyl-3-(dibenzo-1H-pyrrole-1-yl)-5-(methyl)phenyl)-(4-methyl-2-phenoxy)-1,3-propanediylzirconium (IV) dichloride,
bis((2-oxoyl-3-(dibenzo-1H-pyrrole-1-yl)-5-(methyl)phenyl)-(4-methyl-2-phenoxy)-1,3-propanediylzirconium (IV) dibenzyl
bis((2-oxoyl-3-(3,5-di-(1,1-dimethylethyl)phenyl)-5-(methyl)phenyl)-(4-methyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-methyl-2-phenoxy)-1,3-propanediylzirconium (IV) dichloride,
bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl,
bis((2-oxoyl-3-(dibenzo-1,1-pyrrole-1-yl)-5-(methyl)phenyl)-(4-methyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dichloride,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl,
C) bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dibenzyl,
bis((2-oxoyl-3-(dibenzo-1H-pyrrole-1-yl)-5-(methyl)phenyl)-(4-t-butyl-2-phenoxy)-1,3-propanediylzirconium (IV) dimethyl,
bis((2-oxoyl-3-(dibenzo-1H-pyrrole-1-yl)-5-(methyl)phenyl)-(4-t-butyl-2-phenoxy)-1,3-propanediylzirconium (IV) dichloride,
bis((2-oxoyl-3-(dibenzo-1H-pyrrole-1-yl)-5-(methyl)phenyl)-(4-t-butyl-2-phenoxy)-1,3-propanediylzirconium (IV) dibenzyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride,
bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dibenzyl
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

The foregoing metal complexes may be conveniently prepared by standard metallation and ligand exchange procedures involving a source of the transition metal and a neutral polyfunctional ligand source. In addition, the complexes may also be prepared by means of an amide elimination and hydrocarbylation process starting from the corresponding transition metal tetraamide and a hydrocarbylating agent, such as trimethylaluminum. The techniques employed are the same as or analogous to those disclosed in U.S. Pat. Nos. 6,320,005, 6,103,657, WO 02/38628, WO 03/40195, US-A-2004/0220050, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

Monomers

Suitable olefin mixtures for use herein include mixtures of ethylene, one or more $C_{3-30}$ α-olefins and one or more conjugated or nonconjugated dienes. Suitable α-olefin comonomers include, but are not limited to, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, and vinylcyclohexane.

Suitable dienes for use herein include straight chain-, branched chain-, cyclic-, and polycyclic hydrocarbon dienes having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The most especially preferred diene is 5-ethylidene-2-norbornene (ENB).

In general, the polymerization may be accomplished at conditions well known in the prior art for olefin solution polymerization reactions. Preferred polymerization temperatures are from 80 to 250° C., more preferably from 100-200° C. Preferred polymerization pressures are from atmospheric to 3000 atmospheres (100 kPa to 300 MPa), more preferably from 1 MPa to 10 MPa. In most polymerization reactions the molar ratio of catalyst:polymerizable compound employed is from $10^{-12}$:1 to $10^{-1}$:1, more preferably from $10^{-11}$:1 to $10^{-5}$:1. Highly desirably, the reaction is conducted under continuous, solution polymerization conditions, that is, conditions wherein the monomer or monomers are continuously added to a reactor operating under solution polymerization conditions, and polymerized product is continuously or semi-continuously removed and recovered or forwarded to a second reactor.

Desirably, the polymerization mixture comprises an aliphatic or alicyclic liquid diluent. Examples of such aliphatic or alicyclic liquid diluents include straight and branched-chain hydrocarbons such as isobutane, butane, pentane, hexane, heptane, octane, and mixtures thereof; alicyclic hydrocarbons such as cyclohexane, cycloheptane, methylcyclohexane, methylcycloheptane, and mixtures thereof; and perfluorinated hydrocarbons such as perfluorinated $C_{4-10}$ alkanes, and the like. Small quantities of aromatic hydrocarbons such as toluene, ethylbenzene or xylene may be included as well, but are not preferred. Mixtures of the foregoing are also suitable. A preferred liquid diluent is a hydrogenated oligomeric aliphatic hydrocarbon mixture having a distillation, ASTM D 86, IBP of 118° C., distillation, ASTM D 86, Dry Point of 137° C., and Specific Gravity, 15.6° C., ASTM D 1250 of 0.72 sold commercially under the trade designation Isopar™ E, available from ExxonMobil Corporation.

The use of molecular weight control agents or chain transfer agents in the present process is desired. Examples of such molecular weight control agents include hydrogen, trialkyl aluminum compounds, or other known chain transfer agents. Hydrogen is a most preferred molecular weight control agent or chain transfer agent. A particular benefit of the use of the present invention is the ability (depending on reaction conditions) to produce narrow molecular weight distribution ethylene/α-olefin interpolymers. Preferred polymers have Mw/Mn of less than 3.0, more preferably less than 2.6. Such narrow molecular weight distribution polymer products are highly desirable due to improved tensile strength properties as well as reduced levels of extractables and metal values.

Without limiting in any way the scope of the invention, one means for carrying out the present polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Catalyst along with cocatalyst and optionally chain transfer agent are continuously or intermittently introduced in the reactor liquid phase or any recycled portion thereof. The reactor temperature may be controlled by adjusting the solvent/monomer ratio, the catalyst addition rate, as well as by use of cooling or heating coils, jackets or both. The polymerization rate is controlled by the rate of catalyst addition. Pressure is controlled by the monomer flow rate and partial pressures of volatile components. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the flow rate of the previously mentioned chain transfer agent. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, and preferably is from 10 minutes to 6 hours.

Alternatively, the foregoing polymerization may be carried out in a continuous loop reactor with or without a monomer, comonomer, catalyst or cocatalyst gradient established between differing regions thereof, optionally accompanied by separate addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

SPECIFIC EMBODIMENTS

The following embodiments are provided for purposes of specific disclosure for the appended claims.

1. A process for polymerization of ethylene, one or more $C_{3-30}$ α-olefins and one or more conjugated or nonconjugated dienes under continuous, solution polymerization conditions to prepare a high molecular weight interpolymer, said process comprising conducting the polymerization in the presence of a catalyst composition comprising a zirconium complex of a polyvalent aryloxyether corresponding to the formula:

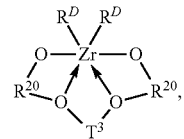

where:
$R^{20}$ independently each occurrence is a divalent aromatic or inertly substituted aromatic group containing from 5 to 20 atoms not counting hydrogen;
$T^3$ is a divalent hydrocarbon or silane group having from 1 to 20 atoms not counting hydrogen, or an inertly substituted derivative thereof;
$R^D$ independently each occurrence is a monovalent ligand group of from 1 to 20 atoms, not counting hydrogen, or two $R^D$ groups together are a divalent ligand group of from 1 to 40 atoms, not counting hydrogen; and
an activating cocatalyst at a temperature from 80 to 250° C. and a pressure from 100 kPa to 300 MPa.

2. The process of embodiment 1 wherein the resulting polymer has a molecular weight distribution, Mw/Mn, less than 3.0.

3. The process of embodiment 1 wherein the catalyst composition additionally comprises a chain transfer agent.

4. The process of embodiment 3 wherein the quantity of chain transfer agent present in the reactor is sufficient to decrease the Mw of the resulting polymer at least 30 percent compared to the molecular weight of the resulting polymer prepared in the absence of a chain transfer agent.

5. The process of embodiment 3 wherein the chain transfer agent is hydrogen, present in an amount from 0.015 to 2.0 mol percent (based on ethylene).

6. The process of embodiment 1 wherein the ethylene conversion is at least 85 mol percent.

7. The process of any one of embodiments 1-6 wherein a monomer mixture consisting essentially of ethylene, propylene, and a diene selected from the group consisting of 1,4-hexadiene, 5-ethylidene-2-norbornene, 5-vinylidene-2-norbornene, 5-methylene-2-norbornene, and dicyclopentadiene is polymerized.

8. The process of embodiment 7 wherein a monomer mixture consisting essentially of ethylene, propylene and 5-ethylidene-2-norbornene is polymerized.

9. The process of embodiment 1 conducted at a temperature from 100 to 200° C. in the presence of a chain transfer agent to prepare a polymer having a melt index, $I_2$, <5.0, a molecular weight distribution Mw/Mn<3.0, and a catalyst efficiency of greater than 0.5 $g_{polymer}/\mu g_{metal}$.

10. The process of embodiment 9 wherein the chain transfer agent is present in a quantity such that the decrease in Mw of the resulting polymer is >30 percent compared to the Mw of the resulting polymer made in the absence of chain transfer agent.

11. The process of embodiment 10 wherein the chain transfer agent is hydrogen present in the reactor in an amount of from 0.015 to 2 mol percent based on ethylene.

12. The process of embodiment 1 wherein the cocatalyst is alumoxane present in an amount to provide a molar ratio based on Zr from 20:1 to 150:1.

13. The process of embodiment 12 wherein the alumoxane is tri(isobutyl)aluminum modified methalumoxane or tri(n-octyl)aluminum modified methalumoxane.

14. A process according to any one of embodiments 1-6 wherein the metal complex corresponds to the formula:

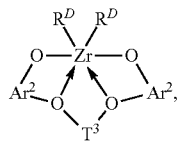

wherein:

$Ar^2$ independently each occurrence is an arylene or an alkyl-, aryl-, alkoxy- or amino-substituted arylene group of from 6 to 20 atoms not counting hydrogen or any atoms of any substituent;

$T^3$ is a divalent hydrocarbon bridging group of from 2 to 20 atoms not counting hydrogen, preferably a divalent substituted or unsubstituted $C_{3-6}$ aliphatic, cycloaliphatic, or bis(alkylene)-substituted cycloaliphatic group; and $R^D$ independently each occurrence is a monovalent ligand group of from 1 to 20 atoms, not counting hydrogen, or two $R^D$ groups together are a divalent ligand group of from 1 to 40 atoms, not counting hydrogen.

15. The process of embodiment 14 wherein the metal complex corresponds to the formula:

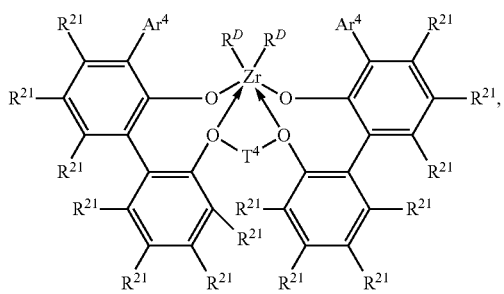

where $Ar^4$ independently each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

16. The process of embodiment 14 wherein the metal complex corresponds to the formula:

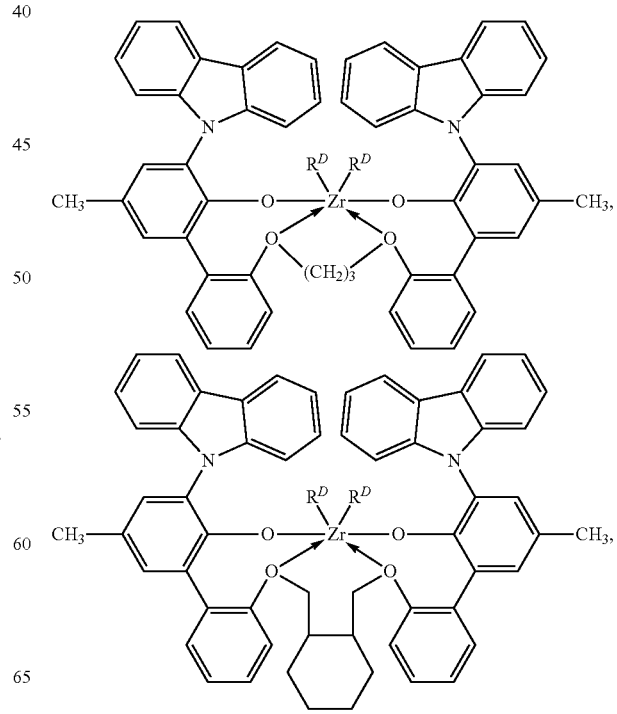

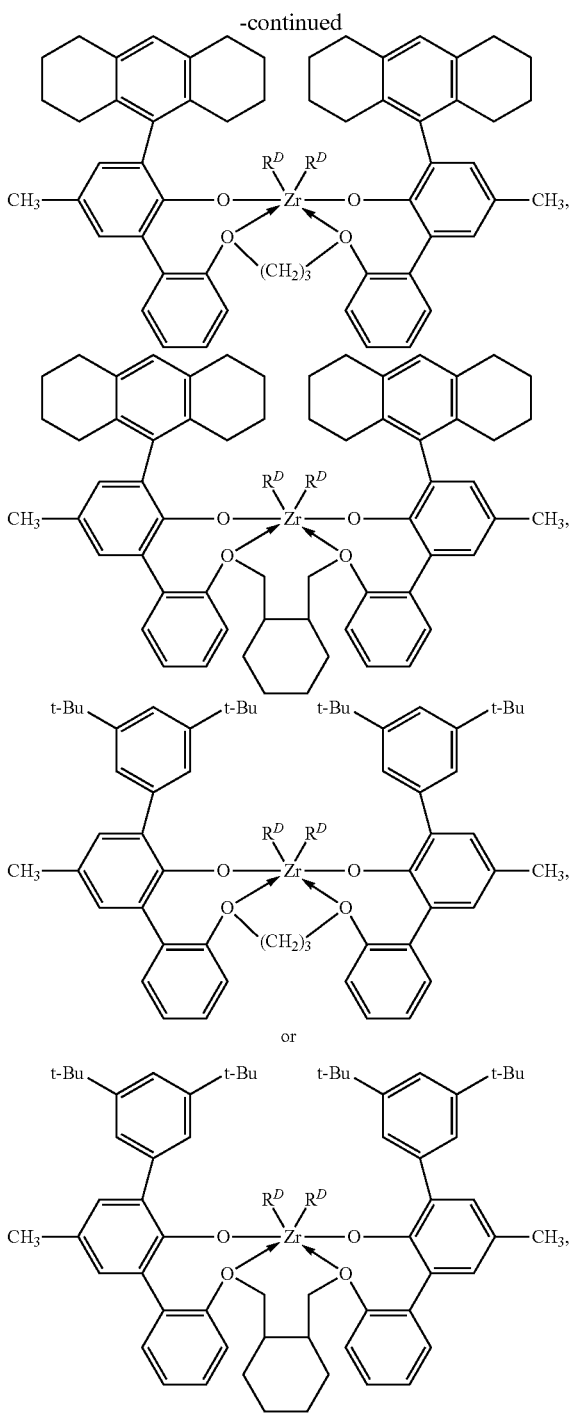

wherein, $R^D$ independently each occurrence is chloro, methyl or benzyl.

17. The process of embodiment 14 wherein the metal complex is selected from the group consisting of:
A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-2-phenoxy)-1,3-propanediylzirconium (IV) dibenzyl,
bis((2-oxoyl-3-(dibenzo-1H-pyrrole-1-yl)-5-(methyl)phenyl)-2-phenoxy)-1,3-propanediylzirconium (IV) dimethyl,
bis((2-oxoyl-3-(dibenzo-1H-pyrrole-1-yl)-5-(methyl)phenyl)-2-phenoxy)-1,3-propanediylzirconium (IV) dichloride,
bis((2-oxoyl-3-(dibenzo-1H-pyrrole-1-yl)-5-(methyl)phenyl)-2-phenoxy)-1,3-propanediylzirconium (IV) dibenzyl,
bis((2-oxoyl-3-(3,5-di-(1,1-dimethylethyl)phenyl)-5-(methyl)phenyl)-2-phenoxy)-1,3-propanediylzirconium (IV) dimethyl,
bis((2-oxoyl-3-(3,5-di-(1,1-dimethylethyl)phenyl)-5-(methyl)phenyl)-2-phenoxy)-1,3-propanediylzirconium (IV) dichloride,
bis((2-oxoyl-3-(3,5-di-(1,1-dimethylethyl)phenyl)-5-(methyl)phenyl)-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride,
bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl,
bis((2-oxoyl-3-(dibenzo-1H-pyrrole-1-yl)-5-(methyl)phenyl)-2-phenoxy)-cis-1,3-cyclohexanediylzirconium (IV) dimethyl,
bis((2-oxoyl-3-(dibenzo-1H-pyrrole-1-yl)-5-(methyl)phenyl)-2-phenoxy)-cis-1,3-cyclohexanediylzirconium (IV) dichloride,
bis((2-oxoyl-3-(dibenzo-1H-pyrrole-1-yl)-5-(methyl)phenyl)-2-phenoxy)-cis-1,3-cyclohexanediylzirconium (IV) dibenzyl
bis((2-oxoyl-3-(3,5-di-(1,1-dimethylethyl)phenyl)-5-(methyl)phenyl)-2-phenoxy)-cis-1,3-cyclohexanediylzirconium (IV) dimethyl, bis((2-oxoyl-3-(3,5-di-(1,1-dimethylethyl)phenyl)-5-(methyl)phenyl)-2-phenoxy)-cis-1,3-cyclohexanediylzirconium (IV) dichloride,
bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dimethyl,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride,
bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dibenzyl,
bis((2-oxoyl-3-(dibenzo-1H-pyrrole-1-yl)-5-(methyl)phenyl)-2-phenoxy)-cis-4,5-cyclohexenediylzirconium (IV) dimethyl,
bis((2-oxoyl-3-(dibenzo-1H-pyrrole-1-yl)-5-(methyl)phenyl)-2-phenoxy)-cis-4,5-cyclohexenediylzirconium (IV) dichloride,
bis((2-oxoyl-3-(dibenzo-1H-pyrrole-1-yl)-5-(methyl)phenyl)-2-phenoxy)-cis-4,5-cyclohexenediylzirconium (IV) dibenzyl
bis((2-oxoyl-3-(3,5-di-(1,1-dimethylethyl)phenyl)-5-(methyl)phenyl)-2-phenoxy)-cis-4,5-cyclohexenediylzirconium (IV) dimethyl,
bis((2-oxoyl-3-(3,5-di-(1,1-dimethylethyl)phenyl)-5-(methyl)phenyl)-2-phenoxy)-cis-4,5-cyclohexenediylzirconium (IV) dichloride,
bis((2-oxoyl-3-(3,5-di-(1,1-dimethylethyl)phenyl)-5-(methyl)phenyl)-2-phenoxy)-cis-4,5-cyclohexenediylzirconium (IV) dibenzyl,
B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dibenzyl,
bis((2-oxoyl-3-(dibenzo-1H-pyrrole-1-yl)-5-(methyl)phenyl)-(4-methyl-2-phenoxy)-1,3-propanediylzirconium (IV) dimethyl,
bis((2-oxoyl-3-(dibenzo-1H-pyrrole-1-yl)-5-(methyl)phenyl)-(4-methyl-2-phenoxy)-1,3-propanediylzirconium (IV) dichloride,
bis((2-oxoyl-3-(dibenzo-1H-pyrrole-1-yl)-5-(methyl)phenyl)-(4-methyl-2-phenoxy)-1,3-propanediylzirconium (IV) dibenzyl
bis((2-oxoyl-3-(3,5-di-(1,1-dimethylethyl)phenyl)-5-(methyl)phenyl)-(4-methyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-methyl-2-phenoxy)-1,3-propanediylzirconium (IV) dichloride,
bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl, bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl, bis((2-oxoyl-3-(3,5-di-(1,1-dimethylethyl)phenyl)-5-(methyl)phenyl)-(4-methylphenoxy))-cis-4,5-cyclohexenediylzirconium (IV) dichloride, bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl, C) bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride, bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dibenzyl, bis((2-oxoyl-3-(dibenzo-1H-pyrrole-1-yl)-5-(methyl)phenyl)-(4-t-butyl-2-phenoxy)-1,3-propanediylzirconium (IV) dimethyl, bis((2-oxoyl-3-(dibenzo-1H-pyrrole-1-yl)-5-(methyl)phenyl)-(4-t-butyl-2-phenoxy)-1,3-propanediylzirconium (IV) dichloride, bis((2-oxoyl-3-(dibenzo-1H-pyrrole-1-yl)-5-(methyl)phenyl)-(4-t-butyl-2-phenoxy)-1,3-propanediylzirconium (IV) dibenzyl, bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl, bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride, bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dichloride, bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dibenzyl, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride, bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dibenzyl bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl, bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dichloride, bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl, bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride, bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl, bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride, bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl, bis((2-oxoyl-3-(3,5-di-(1,1-dimethylethyl)phenyl)-5-(methyl)phenyl)-(4-t-butyl-2-phenoxy))-cis-1,3-cyclohexanediyl zirconium (IV) dimethyl, bis((2-oxoyl-3-(3,5-di-(1,1-dimethylethyl)phenyl)-5-(methyl)phenyl)-(4-t-butyl-2-phenoxy))-cis-1,3-cyclohexanediyl zirconium (IV) dichloride, bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl, bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride, bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride, bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl, bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl, bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

It is understood that the present invention is operable in the absence of any component which has not been specifically disclosed and may be combined with any other suitable reaction or process in a multistep polymerization system design. The following examples are provided in order to further illustrate the invention and are not to be construed as limiting. Unless stated to the contrary, all parts and percentages are expressed on a weight basis.

EXAMPLES

Preparation of Metal Complex

The synthetic procedures of US-A-2004/0010103 were substantially repeated to prepare metal complexes A1 and A11 and Comp.

A1:

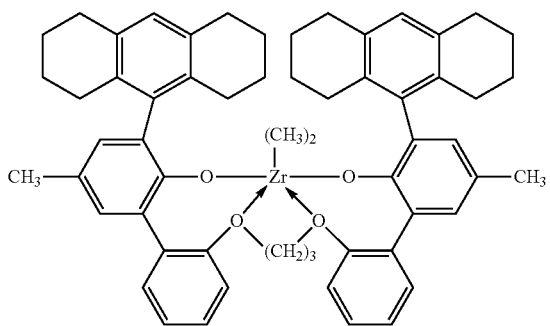

bis((2-oxoyl-3-(1,2,3,4,6,7,8,9-octahydro-
anthracen-5-yl)-5-(methyl)phenyl)-2-phenoxy)-
1,3-propanediyl zirconium (IV) dimethyl

A2:

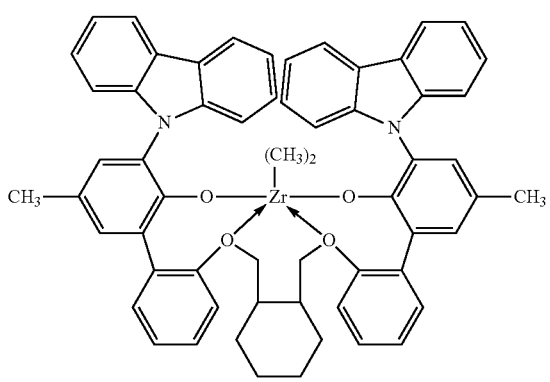

bis((2-oxoyl-3-(dibenzo-1H-pyrrole-1-yl)-5
(methyl)phenyl)-2-phenoxymethyl)-trans-
1,2-cyclohexanediylzirconium (IV) dimethyl

A3:

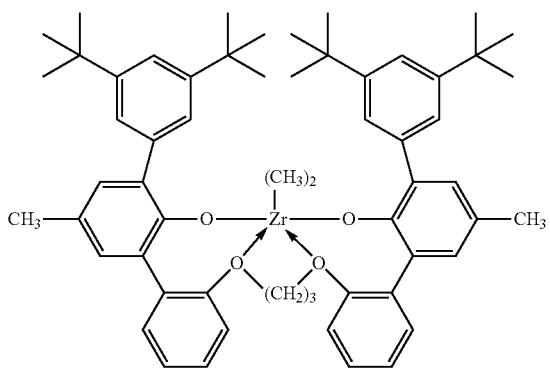

bis((2-oxoyl-3-(3,5-bis-(1,1-dimethylethyl)
phenyl)-5-(methyl)phenyl)-2-phenoxy)-
1,3,-propanediyl zirconium (IV) dimethyl

A4:

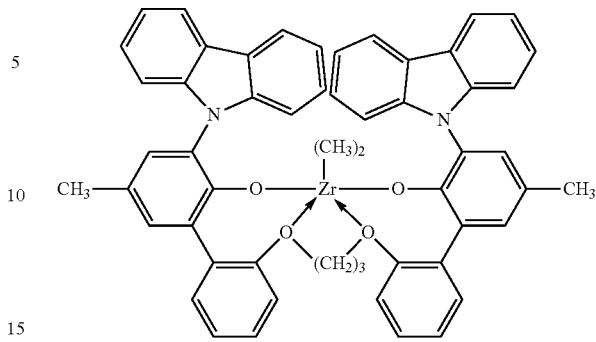

bis((2-oxoyl-3-(dibenzo-1H-pyrrole-1-yl)-5-
(methyl)phenyl)-2-phenoxy)-
1,3-propanediyl zirconium (IV) dimethyl

A5:

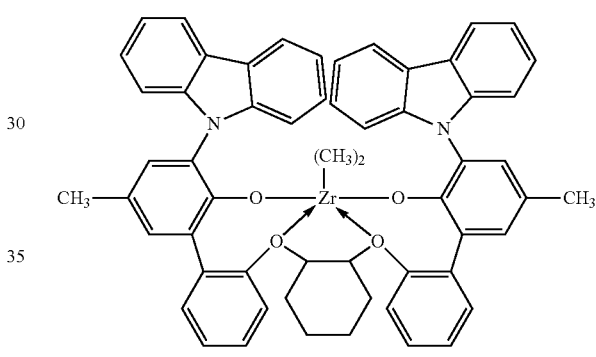

bis((2-oxoyl-3-(dibenzo-1H-pyrrole-1-yl)-5-
(methyl)phenyl)-2-phenoxy)-cis-
1,3-cyclohexanediyl zirconium (IV) dimethyl

A6:

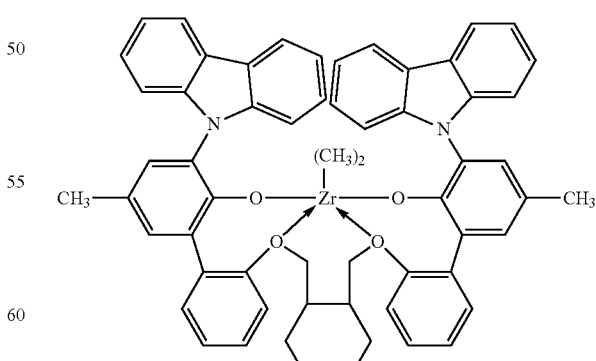

bis((2-oxoyl-3-(dibenzo-1H-pyrrole-1-yl)-5-
(methyl)phenyl)-2-phenoxymethyl)-cis-
4,5-cyclohexanediyl zirconium (IV) dimethyl

A7:

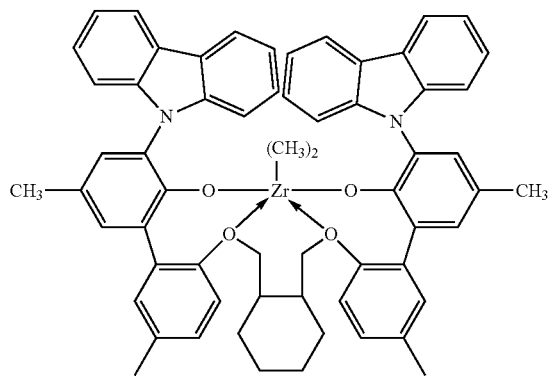

bis((2-oxoyl-3-(dibenzo-1H-pyrrole-1-yl)-5-
(methyl)phenyl)-(4-methyl-2-phenoxymethyl)-
trans 1,2-cyclohexanezirconium (IV) dimethyl

A8:

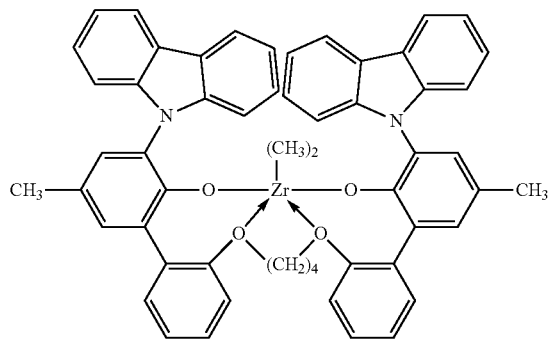

bis((2-oxoyl-3-(dibenzo-1H-pyrrole-1-yl)-5-
(methyl)phenyl)-2-phenoxy)-
1,4-butanediylzirconium (IV) dimethyl

A9:

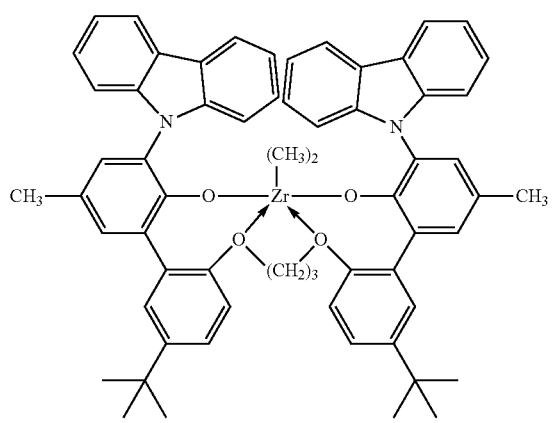

bis((2-oxoyl-3-(dibenzo-1H-pyrrole-1-yl)-5-
(methyl)phenyl)-(5-(2-methyl)propane-2-yl)-2-
phenoxy)-1,3-propanediyl zirconium (IV) dimethyl

A10:

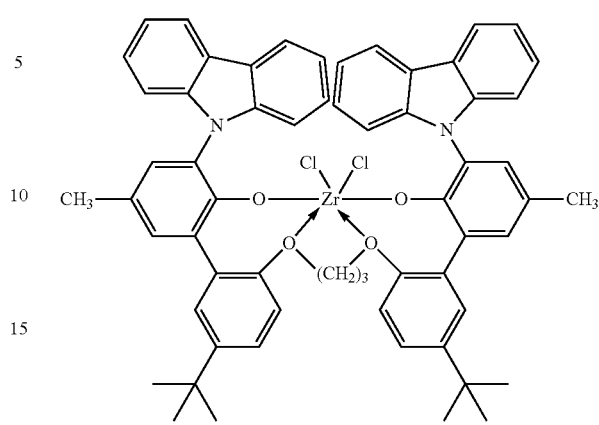

bis((2-oxoyl-3-(dibenzo-1H-pyrrole-1-yl)-5-
(methyl)phenyl)-(5-(2-methyl)propane-2-yl)-2-
phenoxy)-1,3-propanediyl zirconium (IV) dichloride

A11:

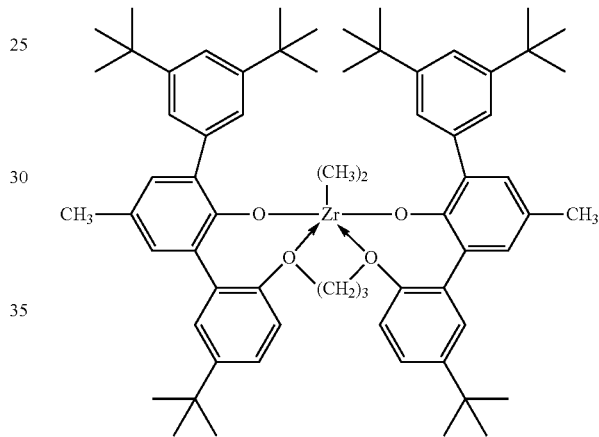

bis(2-oxoyl-3-(3,5-bis-(1,1-dimethylethyl)
phenyl)-5-(methyl)phenyl)-(5-2-methyl)propane-
2-yl)2-phenoxy)-1,3-propanediyl zirconium (IV)
dimethyl Comp:

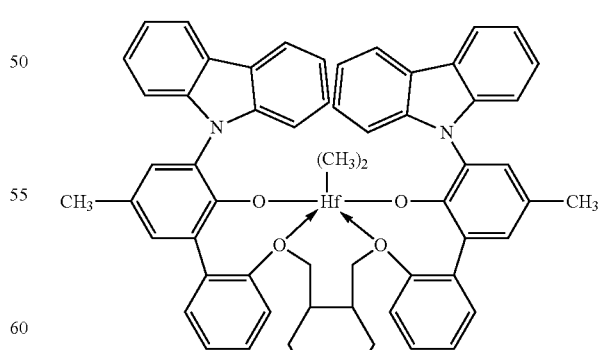

bis((2-oxoyl-3-(dibenzo-1H-pyrrole-1-yl)-5-
(methyl)phenyl)-2-phenoxymethyl)-trans-
1,2-cyclohexanediylhafnium (IV) dimethyl Continuous Polymerization Conditions Continuous solution polymerizations are carried out in a computer controlled autoclave reactor equipped with an internal stirrer. Purified mixed alkanes solvent (Isopar™ E available from ExxonMobil, Inc.), ethylene, propylene, 5-ethylidene-2-norbornene, and hydrogen are continuously supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by mass flow meters and controlled by control valves or by the manual adjustment of needle valves. The remaining solvent is combined with monomers and hydrogen and fed to the reactor. A mass flow controller is used to deliver hydrogen to the reactor as needed. The temperature of the solvent/monomer solution is controlled by use of a heat exchanger before entering the reactor. This stream enters the bottom of the reactor.

The catalyst and cocatalyst component solutions are metered using pumps and mass flow meters and are combined with the catalyst flush solvent and introduced into the bottom of the reactor. The cocatalyst used in runs 1-12 is a long-chain alkyl ammonium borate of approximate stoichiometry equal to methyldi(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of about ⅓ in a molar ratio based on transition metal of 5/1. For runs 13-17 the cocatalyst is MAO alone in a molar ratio based on Zr of 50:1. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

More process details and results are contained in Table 1. Product properties are provided in Table 2. Polymer viscosities are measured at shear rates of 0.1 and 100 radians/second at 190° C. under a nitrogen atmosphere using a dynamic mechanical spectrometer such as a RMS-800™ or ARES™ from Rheometrics Corporation. The viscosities at 0.1 rad/sec and 100 rad/sec may be represented, respectively, as V0.1 and V100 with a ratio of the two referred to as RR and expressed as V0.1/V100.

TABLE 1

| Run | Cat | Al:Zr | B:Zr | T °C. | $C_2H_4$ Flow (kg/h) | $C_3H_6$ Flow (kg/h) | ENB Flow (kg/h) | Solvent Flow (kg/h) | $H_2$ Flow[1] (sccm) | $C_2H_4$[2] Conv. | Eff.[3] |
|---|---|---|---|---|---|---|---|---|---|---|---|
| 1 | A1 | 30 | 1.5 | 133 | 0.49 | 0.33 | 0.07 | 8.35 | 13.0 | 87.6 | 0.54 |
| 2 | " | 20 | " | 125 | " | 0.31 | 0.06 | " | 17.7 | 87.8 | 0.83 |
| 3* | Comp | 25 | " | 127 | " | 0.32 | 0.07 | " | 54.1 | 87.5 | 0.28 |
| 4 | A1 | 75 | 0 | 124 | 0.47 | 0.20 | 0.01 | 7.26 | 23.5 | 88.9 | 1.98 |
| 5 | " | 15 | 1.5 | 101 | 0.33 | 0.40 | 0.43 | 8.35 | 1.7 | 90.5 | 0.51 |
| 6 | " | 10 | " | " | " | 0.41 | 0.55 | " | 1.3 | 91.0 | 0.31 |
| 7 | " | 25 | " | 115 | 0.15 | 0.73 | 0.27 | " | 0 | 90.7 | 0.47 |
| 8 | " | " | " | 114 | " | 0.72 | 0.39 | " | 0 | 90.0 | 0.38 |
| 9* | Comp | " | " | 115 | 0.14 | 0.83 | 0.06 | " | 7.7 | 87.9 | 0.12 |
| 10 | A1 | 75 | " | 101 | " | 0.84 | 0.13 | " | 0 | 88.1 | 0.78 |
| 11 | " | " | " | " | 0.11 | 0.92 | 0.09 | " | 0 | 85.9 | 0.69 |
| 12 | " | 20 | " | 103 | 0.12 | 1.00 | 0.03 | " | 0 | 87.9 | 0.95 |

*Comparative, not an example of the invention
[1] standard $cm^3$/min
[2] percent ethylene conversion in reactor
[3] efficiency, g polymer/μg Metal

TABLE 2

| Run | Mooney[1] | Percent $C_2$ | Percent $C_3$ | Percent ENB | RR |
|---|---|---|---|---|---|
| 1 | 44.02 | 71.27 | 28.25 | 0.48 | 61 |
| 2 | 41.11 | 70.36 | 29.19 | 0.44 | 44 |
| 3* | 43.04 | 67.19 | 32.30 | 0.51 | 10 |
| 4 | 13.9 | 73.79 | 25.20 | 1.01 | — |
| 5 | 59.35 | 51.81 | 44.51 | 3.68 | 68 |
| 6 | 54.48 | 50.50 | 44.60 | 4.90 | 88 |
| 7 | 17.88 | 22.60 | 74.10 | 3.30 | — |
| 8 | 14.98 | 22.00 | 75.60 | 2.40 | — |
| 9* | 19.53 | 20.19 | 79.40 | 0.41 | — |
| 10 | 17.27 | 17.22 | 80.80 | 1.98 | 44 |
| 11 | 17.81 | 16.92 | 81.40 | 1.68 | — |
| 12 | 16.90 | 16.21 | 82.75 | 1.04 | — |

*Comparative, not an example of the invention
[1] Mooney viscosity (ML 1 + 4 @ 100° C.)

TABLE 3

| Run | Cat. | Temp (°C.) | $C_2H_4$ flow (kg/hr) | $C_3H_6$ flow (kg/hr) | ENB flow (kg/hr) | Solvent flow (kg/hr) | $H_2$ (mol %) | $C_2H_4$ Conv. (%)[1] | Cat. Eff.[2] |
|---|---|---|---|---|---|---|---|---|---|
| 13 | A1 | 153 | 1.08 | 0.71 | 0.03 | 10.4 | 0.013 | 88.2 | 2.29 |
| 14 | A7 | 150 | " | " | " | 10.5 | 0.070 | 88.1 | 2.01 |
| 15 | A5 | 120 | " | 0.77 | 0.02 | 11.1 | 0.001 | 87.5 | 2.00 |

TABLE 3-continued

| Run | Cat. | Temp (°C.) | C₂H₄ flow (kg/hr) | C₃H₆ flow (kg/hr) | ENB flow (kg/hr) | Solvent flow (kg/hr) | H₂ (mol %) | C₂H₄ Conv. (%)[1] | Cat. Eff.[2] |
|---|---|---|---|---|---|---|---|---|---|
| 16 | A11 | 150 | " | 0.94 | 0.03 | 10.5 | 0.009 | 88.2 | 1.72 |
| 17 | A9 | 120 | " | 0.91 | " | 10.1 | 0.003 | 87.7 | 0.86 |

[1]percent ethylene conversion in reactor
[2]efficiency, g PE/μg Zr

TABLE 4

| Run | Mooney[1] | Percent C2 | Percent C3 | Percent ENB | RR |
|---|---|---|---|---|---|
| 13 | 43 | 71.0 | 28.1 | 0.9 | 123.6 |
| 14 | 46 | 71.8 | 27.2 | 1.0 | 122.9 |
| 15 | 40 | 71.5 | 27.4 | 1.0 | 40.3 |
| 16 | 44 | 71.7 | 27.3 | 0.9 | 52.9 |
| 17 | 10 | 72.6 | 26.4 | 1.0 | 6.7 |

[1]Mooney viscosity (ML 1 + 4 @ 100° C.)

The invention claimed is:

1. A process for polymerization of ethylene, one or more $C_{3-30}$ α-olefins and one or more conjugated or nonconjugated dienes under continuous, solution polymerization conditions to prepare an interpolymer, said process comprising conducting the polymerization in the presence of a catalyst composition comprising a zirconium complex of a polyvalent aryloxyether corresponding to the formula:

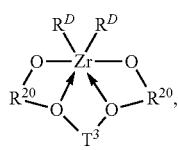

where:
R²⁰ independently each occurrence is a divalent aromatic or inertly substituted aromatic group containing from 5 to 20 atoms not counting hydrogen;
T³ is a divalent hydrocarbon or silane group having from 1 to 20 atoms not counting hydrogen, or an inertly substituted derivative thereof;
R^D independently each occurrence is a monovalent ligand group of from 1 to 20 atoms, not counting hydrogen, or two R^D groups together are a divalent ligand group of from 1 to 40 atoms, not counting hydrogen; and
an activating cocatalyst at a temperature of from 80 to 250° C. and a pressure of from 100 kPa to 300 MPa.

2. The process of claim 1 wherein the resulting polymer has a molecular weight distribution, Mw/Mn, of less than 3.0.

3. The process of claim 1 wherein the catalyst composition additionally comprises a chain transfer agent.

4. The process of claim 3 wherein the quantity of chain transfer agent present in the reactor is sufficient to decrease the Mw of the resulting polymer at least 30 percent compared to the molecular weight of the resulting polymer prepared in the absence of a chain transfer agent.

5. The process of claim 3 wherein the chain transfer agent is hydrogen, present in an amount of from 0.015 to 2.0 mol percent (based on ethylene).

6. The process of claim 1 wherein the ethylene conversion is at least 85 mol percent.

7. The process of claim 1 wherein a monomer mixture consisting essentially of ethylene, propylene, and a diene selected from the group consisting of 1,4-hexadiene, 5-ethylidene-2-norbornene, 5-vinylidene-2-norbornene, 5-methylene-2-norbornene, and dicyclopentadiene is polymerized.

8. The process of claim 7 wherein a monomer mixture consisting essentially of ethylene, propylene and 5-ethylidene-2-norbornene is polymerized.

9. The process of claim 1 conducted at a temperature of from 100 to 200° C. in the presence of a chain transfer agent to prepare a polymer having a melt index, $I_2$, <5.0, a molecular weight distribution Mw/Mn<3.0, and a catalyst efficiency of greater than 0.5 $g_{polymer}/\mu g_{metal}$.

10. The process of claim 9 wherein the chain transfer agent is present in a quantity such that the decrease in Mw of the resulting polymer is >30 percent compared to the Mw of the resulting polymer made in the absence of chain transfer agent.

11. The process of claim 10 wherein the chain transfer agent is hydrogen present in the reactor in an amount of from 0.015 to 2 mol percent based on ethylene.

12. The process of claim 1 wherein the cocatalyst is alumoxane present in an amount to provide a molar ratio based on Zr of from 20:1 to 150:1.

13. The process of claim 12 wherein the alumoxane is tri(isobutyl)aluminum modified methalumoxane or tri(n-octyl)aluminum modified methalumoxane.

14. The process according to any one of claims 1-6 wherein the metal complex corresponds to the formula:

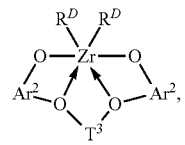

wherein:
Ar² independently each occurrence is an arylene or an alkyl-, aryl-, alkoxy- or amino-substituted arylene group of from 6 to 20 atoms not counting hydrogen or any atoms of any substituent;
T³ is a divalent hydrocarbon bridging group of from 2 to 20 atoms not counting hydrogen, and
R^D independently each occurrence is a monovalent ligand group of from 1 to 20 atoms, not counting hydrogen, or two R^D groups together are a divalent ligand group of from 1 to 40 atoms, not counting hydrogen.

15. The process of claim 14 wherein the metal complex corresponds to the formula:

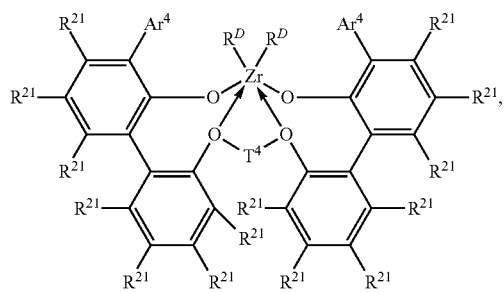

where

Ar⁴ independently each occurrence is $C_{6-20}$ aryl or inertly substituted derivatives thereof;

T⁴ independently each occurrence is a propylene-1,3-diyl group, a cyclohexan-1,2-diyl group, a bis(alkylene)cyclohexan-1,2-diyl group, a cyclohexen-4,5-diyl group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

16. A process for polymerization of ethylene, one or more $C_{3-30}$ α-olefins and one or more conjugated or nonconjugated dienes under continuous, solution polymerization conditions to prepare an interpolymer, said process comprising conducting the polymerization in the presence of a catalyst composition comprising a zirconium complex of a polyvalent aryloxyether corresponding to the formula:

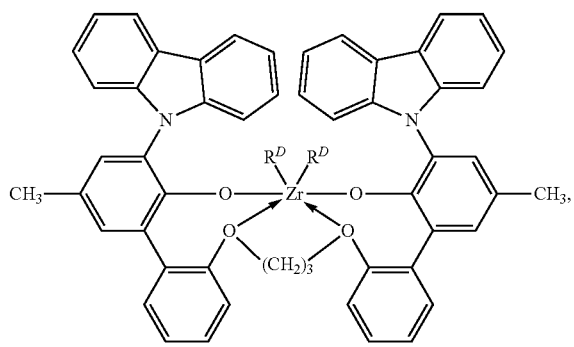

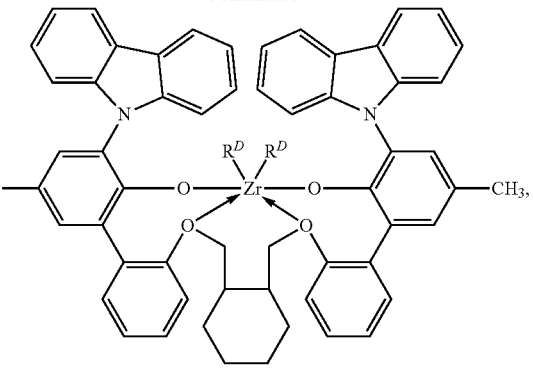

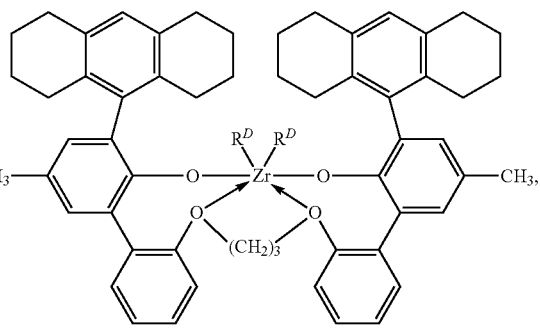

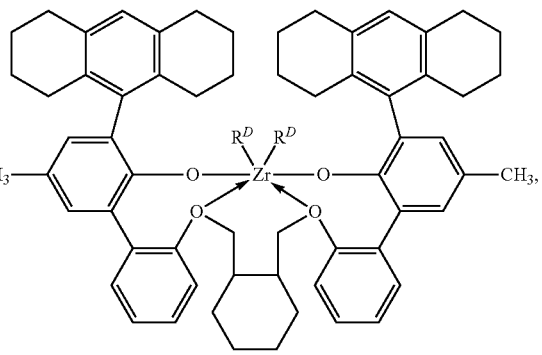

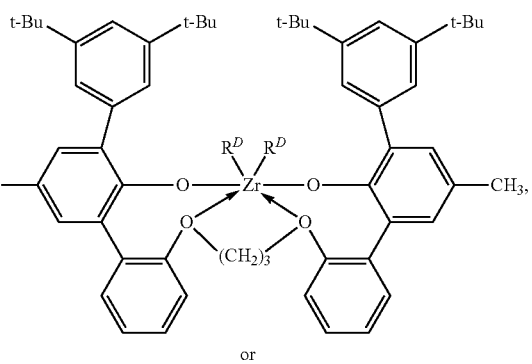

or

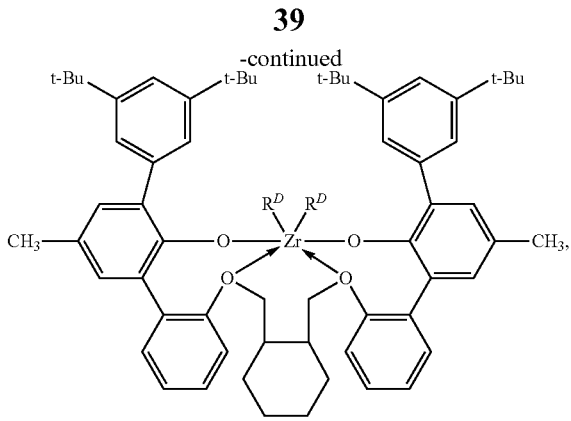

wherein, $R^D$ independently each occurrence is chloro, methyl or benzyl.

17. A process for polymerization of ethylene, one or more $C_{3-30}$ α-olefins and one or more conjugated or nonconjugated dienes under continuous, solution polymerization conditions to prepare an interpolymer, said process comprising conducting the polymerization in the presence of a catalyst composition comprising a zirconium complex is selected from the group consisting of:

A) bis((2-oxoyl-3-(1,2,3,4,6,7,8,9-octahydroanthracen-5-yl)-5-(methyl)phenyl)-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-2-phenoxy)-1,3-propanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dibenzyl, bis((2-oxoyl-3-(dibenzo-1H-pyrrole-1-yl)-5-(methyl)phenyl)-2-phen oxy)-1,3-propanediylzirconium (IV) dimethyl, bis((2-oxoyl-3-(dibenzo-1H-pyrrole-1-yl)-5-(methyl)phenyl)-2-phenoxy)-1,3-propanediylzirconium (IV) dichloride, bis((2-oxoyl-3-(dibenzo-1H-pyrrole-1-yl)-5-(methyl)phenyl)-2-phenoxy)-1,3-propanediylzirconium (IV) dibenzyl, bis((2-oxoyl-3-(3,5-di-(1,1-dimethylethyl)phenyl)-5-(methyl)phenyl)-2-phenoxy)-1,3-propanediylzirconium (IV) dimethyl, bis((2-oxoyl-3-(3,5-di-(1,1-dimethylethyl)phenyl)-5-(methyl)phenyl)-2-phenoxy)-1,3-propanediylzirconium (IV) dichloride, bis((2-oxoyl-3-(3,5-di-(1,1-dimethylethyl)phenyl)-5-(methyl)phenyl)-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dimethyl, bis((2-oxoyl-3-(1,2,3,4,6,7,8,9-octahydroanthracen-5-yl)-5-(methyl)phenyl)-2-phenoxymethyl)-trans-1,2-cyclohexanediylzirconium (IV) dichloride, bis((2-oxoyl-3-(1,2,3,4,6,7,8,9-octahydroanthracen-5-yl)-5-(methyl)phenyl)-2-phenoxymethyl)trans-1,2-cyclohexanediylzirconium (IV) dibenzyl, bis((2-oxoyl-3-(dibenzo-1H-pyrrole-1-yl)-5-(methyl)phenyl)-2-phenoxymethyl)-trans-1,2-cyclohexanediylzirconium (IV) dimethyl, bis((2-oxoyl-3-(dibenzo-1H-pyrrole-1-yl)-5-(methyl)phenyl)-2-phenoxymethyl)-trans-1,2-cyclohexanediylzirconium (IV) dichloride, bis((2-oxoyl-3-(dibenzo-1H-pyrrole-1-yl)-5-(methyl)phenyl)-2-phenoxymethyl)-trans-1,2-cyclohexanediylzirconium (IV) dibenzyl, bis((2-oxoyl-3-(3,5-di-(1,1-dimethylethyl)phenyl)-5-(methyl)phenyl)-2-phenoxymethyl)-trans-1,2-cyclohexanediylzirconium (IV) dimethyl, bis((2-oxoyl-3-(3,5-di-(1,1-dimethylethyl)phenyl)-5-(methyl)phenyl)-2-phenoxymethyl)-trans-1,2-cyclohexanediylzirconium (IV) dichloride, bis((2-oxoyl-3-(3,5-di-(1,1-dimethylethyl)phenyl)-5-(methyl)phenyl)-2-phenoxymethyl)-trans-1,2-cyclohexanediylzirconium (IV) dibenzyl, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dimethyl, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dichloride, bis((2-oxoyl-3-(1,2,3,4,6,7,8,9-octahydroanthracen-5-yl)-5-(methyl)phenyl)-2-phenoxy)-cis-1,3-cyclohexanediylzirconium (IV) dibenzyl, bis((2-oxoyl-3-(dibenzo-1H-pyrrole-1-yl)-5-(methyl)phenyl)-2-phenoxy)-cis-1,3-cyclohexanediylzirconium (IV) dimethyl, bis((2-oxoyl-3-(dibenzo-1H-pyrrole-1-yl)-5-(methyl)phenyl)-2-phenoxy)-cis-1,3-cyclohexanediylzirconium (IV) dichloride, bis((2-oxoyl-3-(dibenzo-1H-pyrrole-1-yl)-5-(methyl)phenyl)-2-phenoxy)-cis-1,3-cyclohexanediylzirconium (IV) dibenzyl bis((2-oxoyl-3-(3,5-di-(1,1-dimethylethyl)phenyl)-5-(methyl)phenyl)-2-phenoxy)-cis-1,3-cyclohexanediylzirconium (IV) dimethyl, bis((2-oxoyl-3-(3,5-di-(1,1-dimethylethyl)phenyl)-5-(methyl)phenyl)-2-phenoxy)-cis-1,3-cyclohexanediylzirconium (IV) dichloride, bis((2-oxoyl-3-(3,5-di-(1,1-dimethylethyl)phenyl)-5-(methyl)phenyl)-2-phenoxy)-cis-1,3-cyclohexanediylzirconium (IV) dibenzyl, bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dimethyl, bis((2-oxoyl-3-(1,2,3,4,6,7,8,9-octahydroanthracen-5-yl)-5-(methyl)phenyl)-2-phenoxy)-cis-4,5-cyclohexenediylzirconium (IV) dichloride, bis((2-oxoyl-3-(1,2,3,4,6,7,8,9-octahydroanthracen-5-yl)-5-(methyl)phenyl)-2-phen oxy)-cis-4,5-cyclohexenediylzirconium (IV) dibenzyl, bis((2-oxoyl-3-(dibenzo-1H-pyrrole-1-yl)-5-(methyl)phenyl)-2-phenoxy)-cis-4,5-cyclohexenediylzirconium (IV) dimethyl, bis((2-oxoyl-3-(dibenzo-1H-pyrrole-1-yl)-5-(methyl)phenyl)-2-phenoxy)-cis-4,5-cyclohexenediylzirconium (IV) dichloride, bis((2-oxoyl-3-(dibenzo-1H-pyrrole-1-yl)-5-(methyl)phenyl)-2-phenoxy)-cis-4,5-cyclohexenediylzirconium (IV) dibenzyl bis((2-oxoyl-3-(3,5-di-(1,1-dimethylethyl)phenyl)-5-(methyl)phenyl)-2-phenoxy)-cis-4,5-cyclohexenediylzirconium (IV) dimethyl, bis((2-oxoyl-3-(3,5-di-(1,1-dimethylethyl)phenyl)-5-(methyl)phenyl)-2-phenoxy)-cis-4,5-cyclohexenediylzirconium (IV) dichloride, bis((2-oxoyl-3-(3,5-di-(1,1-dimethylethyl)phenyl)-5-(methyl)phenyl)-2-phenoxy)-cis-4,5-cyclohexenediylzirconium (IV) dibenzyl, B) bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-methyl-2-phenoxy)-1,3-propanediylzirconium (IV) dibenzyl,
bis((2-oxoyl-3-(dibenzo-1H-pyrrole-1-yl)-5-(methyl)phenyl)-(4-methyl-2-phenoxy)-1,3-propanediylzirconium (IV) dimethyl,
bis((2-oxoyl-3-(dibenzo-1H-pyrrole-1-yl)-5-(methyl)phenyl)-(4-methyl-2-phenoxy)-1,3-propanediylzirconium (IV) dichloride,
bis((2-oxoyl-3-(dibenzo-1H-pyrrole-1-yl)-5-(methyl)phenyl)-(4-methyl-2-phenoxy)-1,3-propanediylzirconium (IV) dibenzyl
bis((2-oxoyl-3-(3,5-di-(1,1-dimethylethyl)phenyl)-5-(methyl)phenyl)-(4-methyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-methyl-2-phenoxy)-1,3-propanediylzirconium (IV) dichloride,
bis((2-oxoyl-3-(3,5-di-(1,1-dimethylethyl)phenyl)-5-(methyl)phenyl)-(4-methyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-methyl-2-phenoxy methyl)-trans-1,2-cyclohexanediylzirconium (IV) dimethyl,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-methyl-2-phenoxymethyl)-trans-1,2-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dichloride,
bis((2-oxoyl-3-(3,5-di-(1,1-dimethylethyl)phenyl)-5-(methyl)phenyl)-(4-methyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-1,3-cyclohexanediylzirconium (IV) dibenzyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-methyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-methyl-2-phenoxy))-cis-1,3-cyclohexanediylzirconium (IV) dichloride,
bis((2-oxoyl-3-(3,5-di-(1,1-dimethyl ethyl)phenyl)-5-(methyl)phenyl)-(4-methyl-2-phenoxy))-cis-1,3-cyclohexanediylzirconium (IV) dibenzyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-methyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-methyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dichloride,
bis((2-oxoyl-3-(3,5-di-(1,1-dimethylethyl)phenyl)-5-(methyl)phenyl)-(4-methyl-2-phenoxy))-cis-4,5-cyclohexenediylzirconium (IV) dibenzyl,
C) bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy)-1,3-propanediylzirconium (IV) dibenzyl,
bis((2-oxoyl-3-(dibenzo-1H-pyrrole-1-yl)-5-(methyl)phenyl)-(4-t-butyl-2-phenoxy)-1,3-propanediylzirconium (IV) dimethyl,
bis((2-oxoyl-3-(dibenzo-1H-pyrrole-1-yl)-5-(methyl)phenyl)-(4-t-butyl-2-phenoxy)-1,3-propanediylzirconium (IV) dichloride,
bis((2-oxoyl-3-(dibenzo-1H-pyrrole-1-yl)-5-(methyl)phenyl)-(4-t-butyl-2-phenoxy)-1,3-propanediylzirconium (IV) dibenzyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dimethyl,
bis((2-oxoyl-3-(3,5-di-(1,1-dimethylethyl)phenyl)-5-(methyl)phenyl)-(4-t-butyl-2-phenoxy)-1,3-propanediylzirconium (IV) dichloride, bis((2-oxoyl-3-(3,5-di-(1,1-dimethylethyl)phenyl)-5-(methyl)phenyl)-(4-t-butyl-2-phenoxy)-1,3-propanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxymethyl)-trans-1,2-cyclohexanediylzirconium (IV) dibenzyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dimethyl,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dichloride,
bis((2-oxoyl-3-(dibenzo-1H-pyrrole-1-yl)-5-(methyl)phenyl)-(4-t-butyl-2-phenoxymethyl)-trans-1,2-cyclohexanediylzirconium (IV) dibenzyl
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dimethyl,
bis((2-oxoyl-3-(3,5-di-(1,1-dimethylethyl)phenyl)-5-(methyl)phenyl)-(4-t-butyl-2-phen oxy methyl)trans-1,2-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxymethyl)-trans-1,2-cyclohexanediylzirconium (IV) dibenzyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-1,3-cyclohexanediylzirconium (IV) dibenzyl
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dimethyl,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dichloride,
bis((2-oxoyl-3-(dibenzo-1H-pyrrole-1-yl)-5-(methyl)phenyl)-(4-t-butyl-2-phenoxy))-cis-1,3-cyclohexanediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dichloride,
bis((2-oxoyl-3-(3,5-di-(1,1-dimethylethyl)phenyl)-5-(methyl)phenyl)-(4-t-butyl-2-phenoxy))-cis-1,3-cyclohexanediylzirconium (IV) dibenzyl
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dimethyl,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dichloride,
bis((2-oxoyl-3-(1,2,3,4,6,7,8,9-octahydroanthracen-5-yl)-5-(methyl)phenyl)-(4-t-butyl-2-phenoxy))-cis-4,5-cyclohexenediylzirconium (IV) dibenzyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dimethyl,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dichloride,
bis((2-oxoyl-3-(dibenzo-1H-pyrrole-1-yl)-5-(methyl)phenyl)-(4-t-butyl-2-phenoxy))-cis-4,5-cyclohexenediylzirconium (IV) dibenzyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dimethyl,
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dichloride, and
bis((2-oxoyl-3-(3,5-di-(1,1-dimethylethyl)phenyl)-5-(methyl)phenyl)-(4-t-butyl-2-phenoxy))-cis-4,5-cyclohexenediylzirconium (IV) dibenzyl.

* * * * *